United States Patent [19]

Haaker et al.

[11] 4,221,516

[45] Sep. 9, 1980

[54] MASTER-SLAVE MANIPULATOR

[75] Inventors: Lester W. Haaker; Demetrius G. Jelatis, both of Red Wing, Minn.

[73] Assignee: Central Research Laboratories, Inc., Red Wing, Minn.

[21] Appl. No.: 911,232

[22] Filed: May 31, 1978

[51] Int. Cl.² .............................................. B25J 3/00
[52] U.S. Cl. ............................................ 414/5; 414/6
[58] Field of Search ..................... 414/1, 2, 3, 4, 5, 6, 414/7, 8

[56] References Cited

U.S. PATENT DOCUMENTS

| | | | |
|---|---|---|---|
| 2,846,084 | 8/1958 | Goertz et al. | 414/5 |
| 3,212,651 | 10/1965 | Specht et al. | 414/7 |
| 3,219,200 | 11/1965 | Ainsworth | 414/4 |
| 3,344,936 | 10/1967 | Saunders | 414/6 |
| 3,425,569 | 2/1969 | Haaker | 414/8 |
| 3,428,189 | 2/1969 | Ainsworth | 414/5 |
| 3,570,816 | 3/1971 | Germond et al. | 414/6 X |

*Primary Examiner*—L. J. Paperner
*Attorney, Agent, or Firm*—Burd, Bartz & Gutenkauf

[57] ABSTRACT

An improved remote control master-slave manipulator of the type by which an operator working on one side of a protective barrier wall may perform work on the opposite side of that wall. The improved manipulator is characterized by a unique power assist tong system permitting increased handling capacity. It has a rotating counterweight system for improved balancing of the manipulator in its "Y" motion forwardly away from the operator. It has means for translating linear motion into rotary motion for transfer through the barrier wall and retranslation into linear motion. The wrist joint assemblies are remotely removable, replaceable and interchangeable as are the tong assemblies.

20 Claims, 57 Drawing Figures

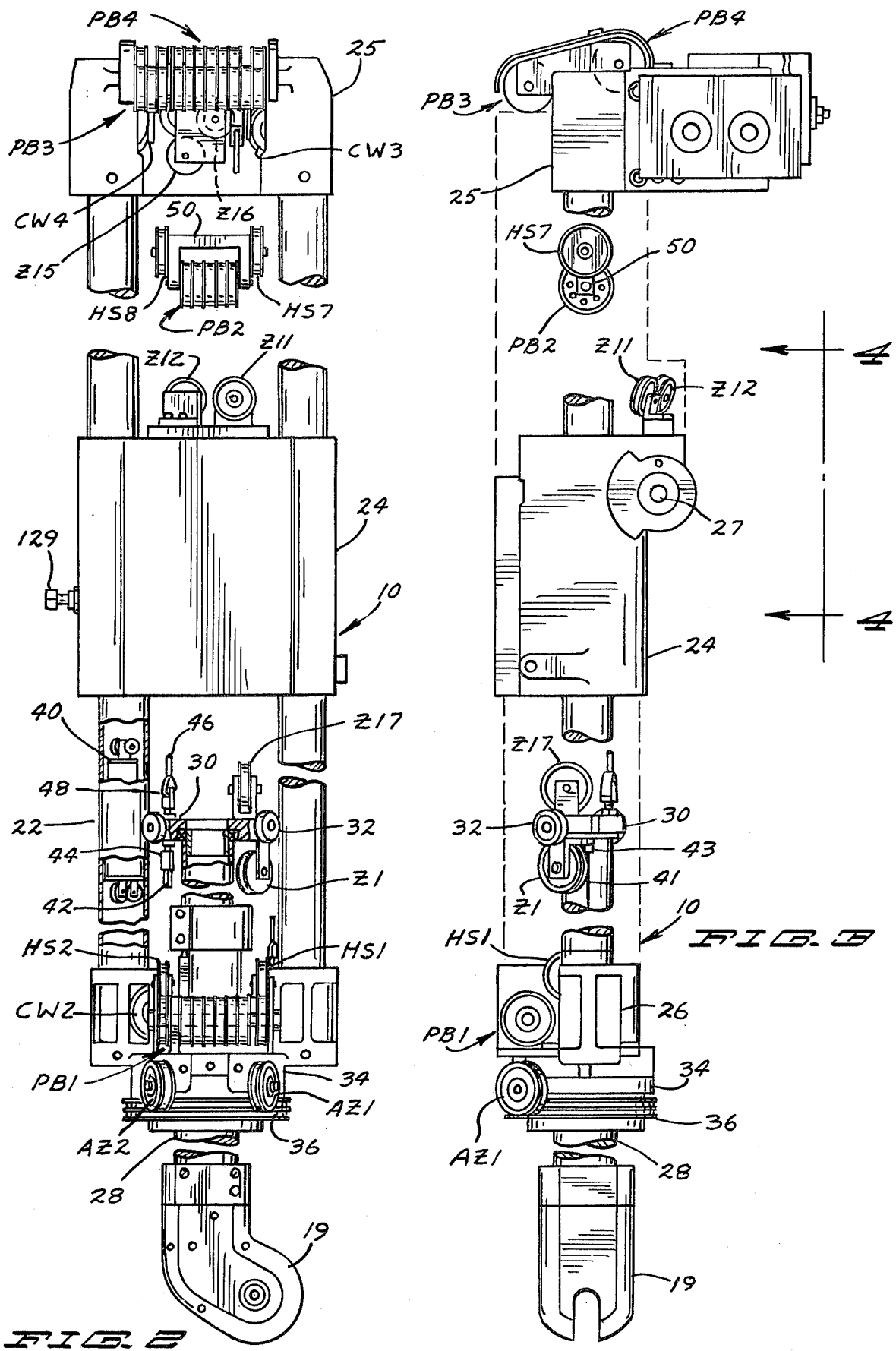

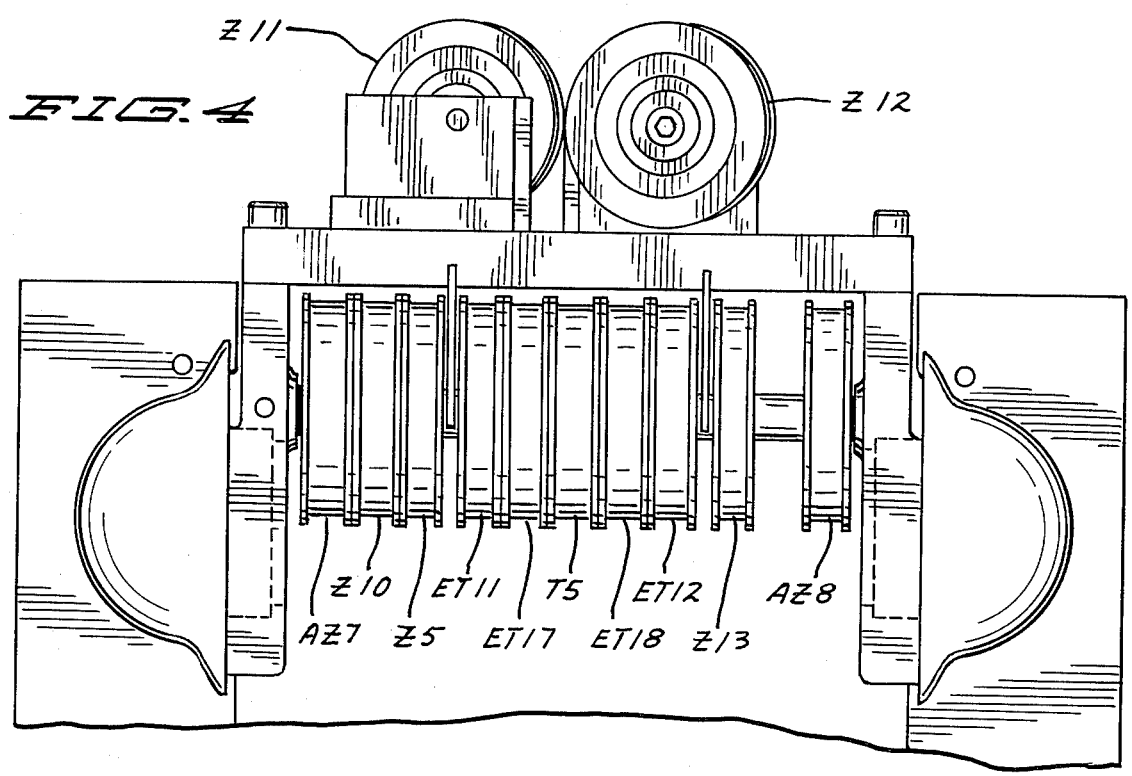
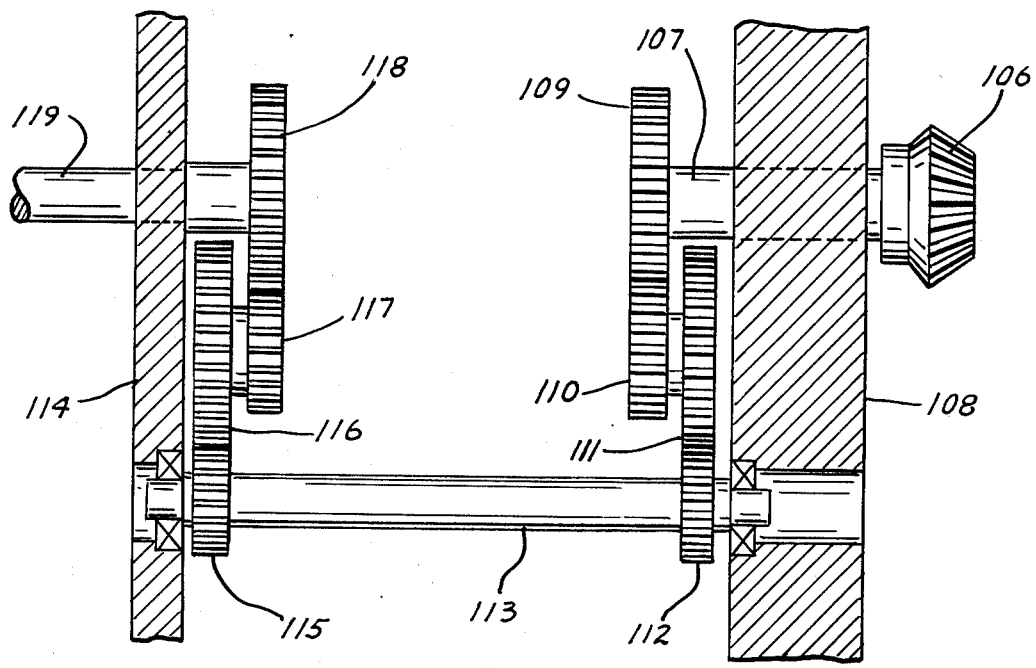

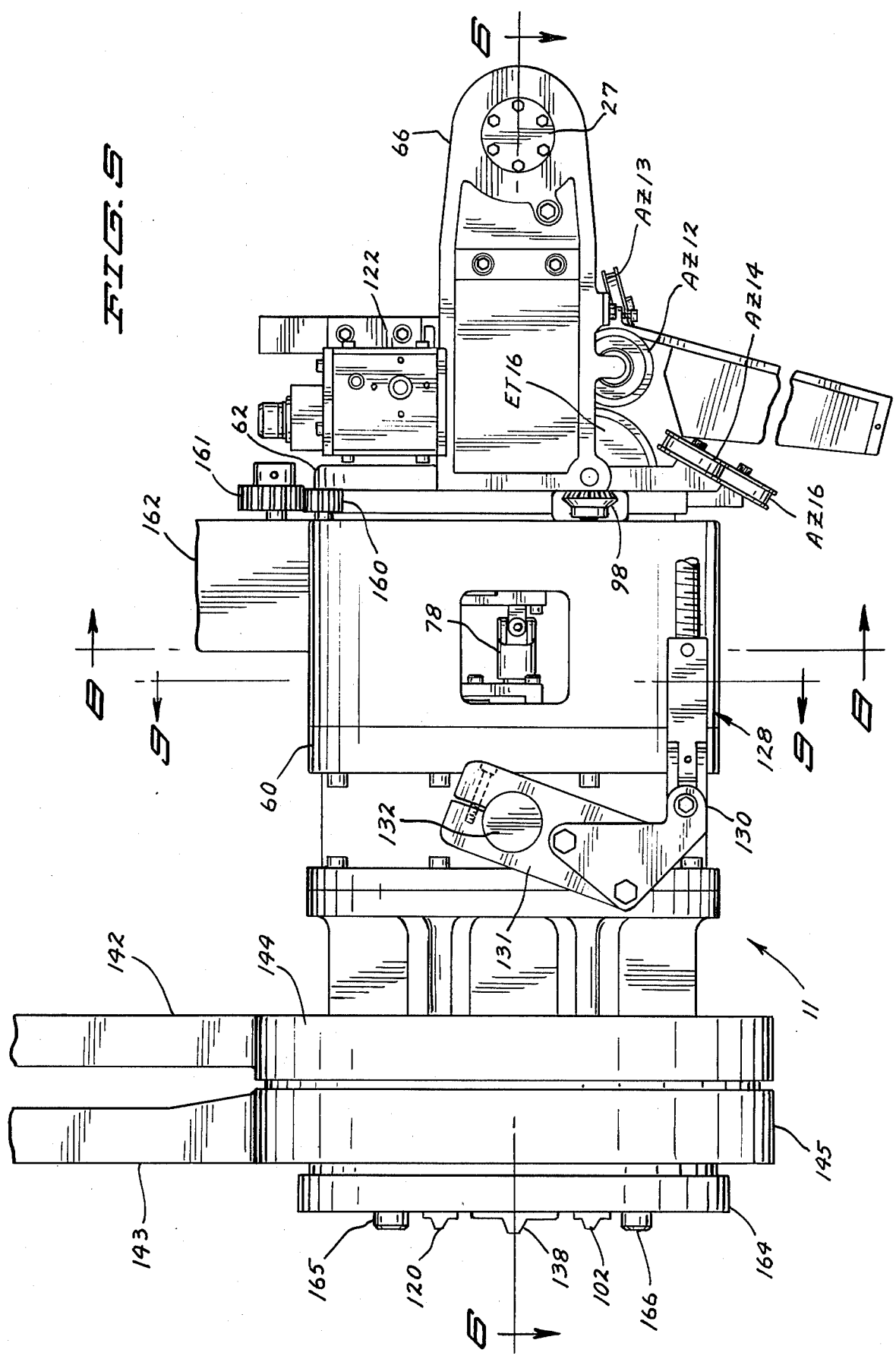

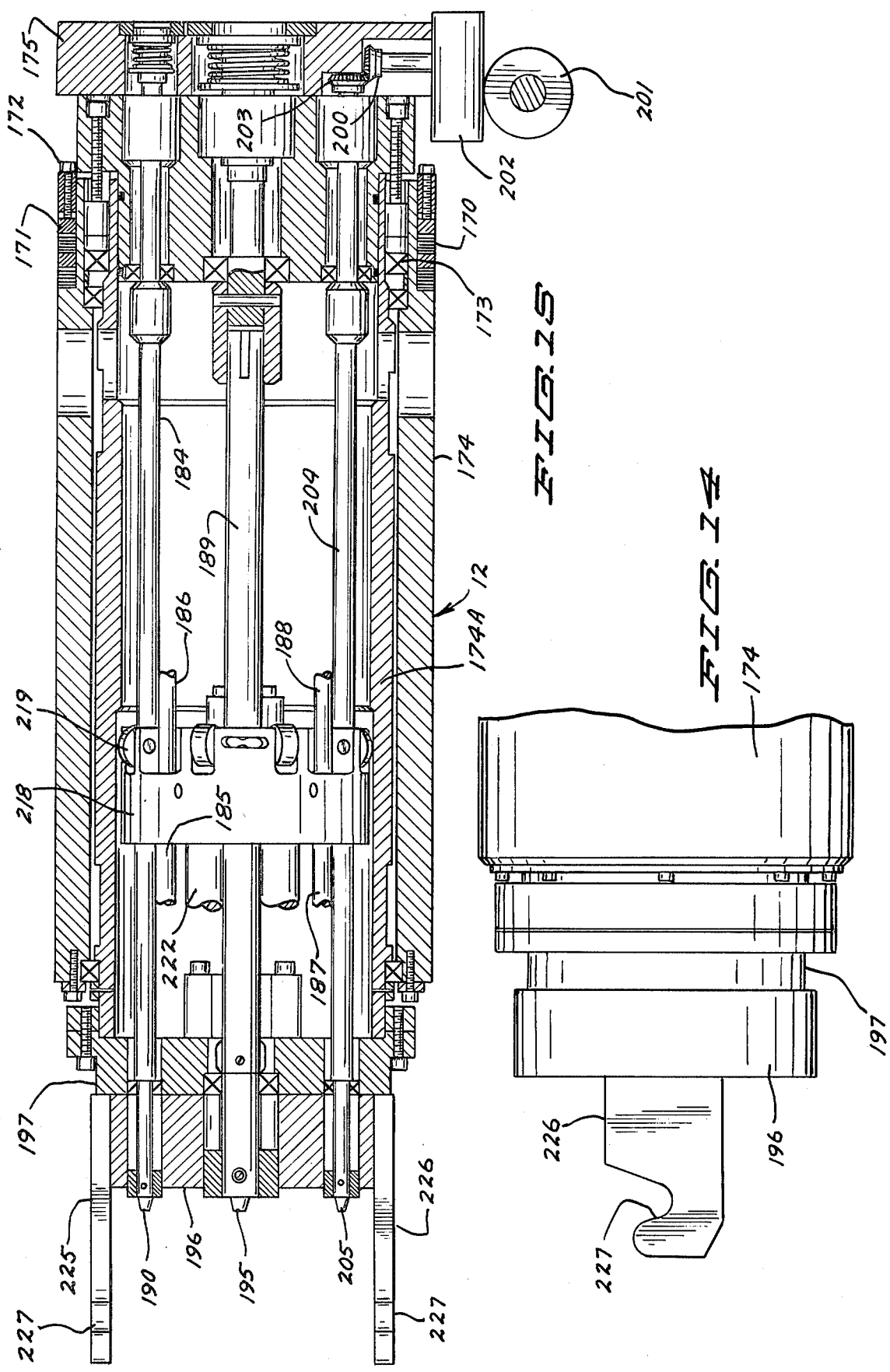

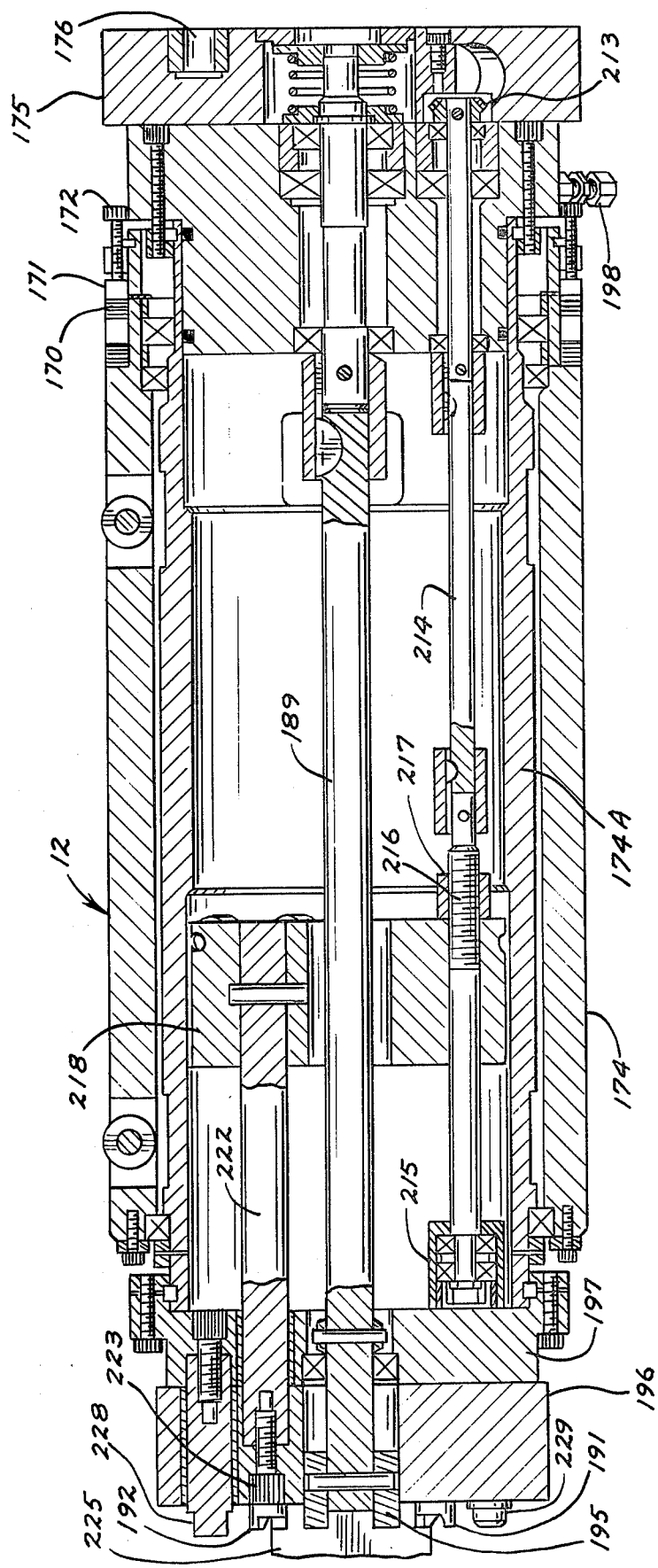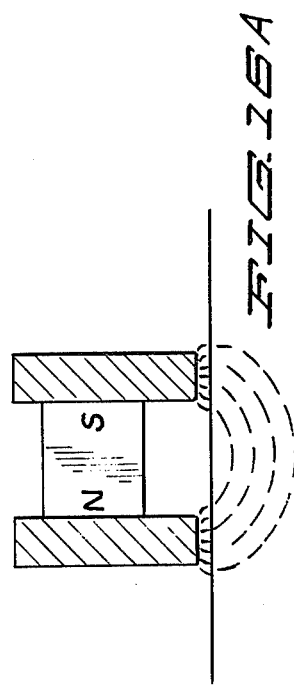

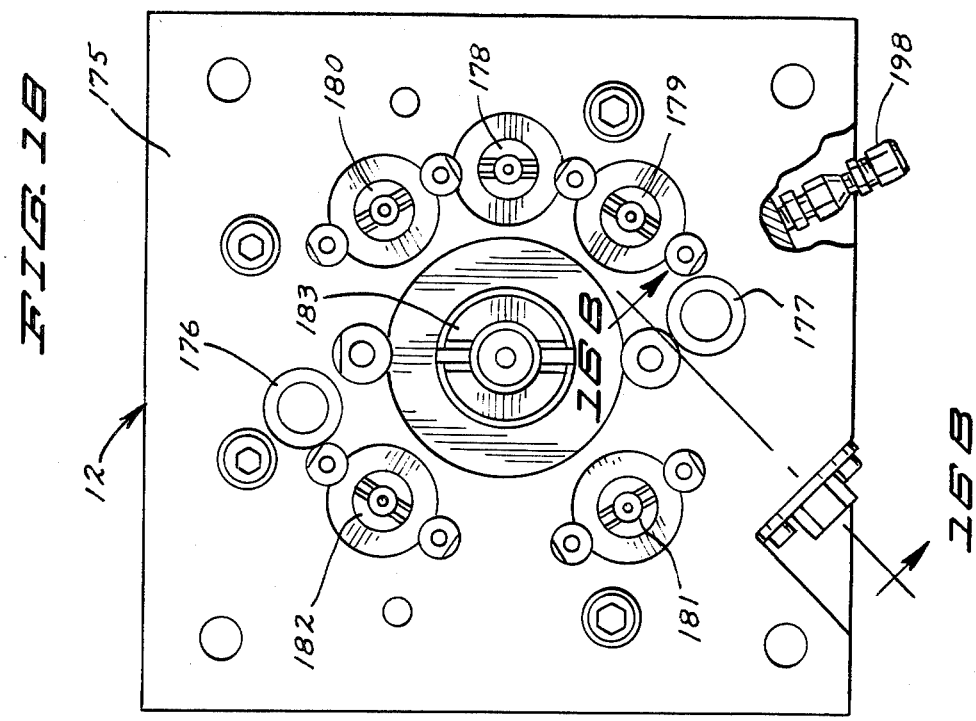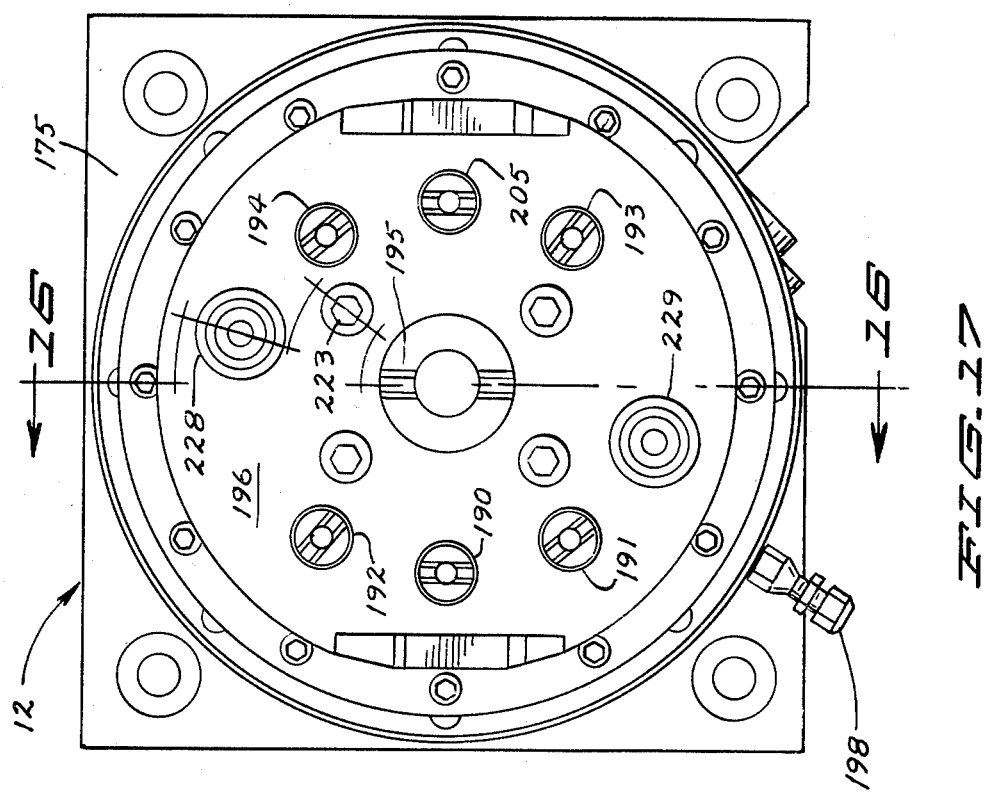

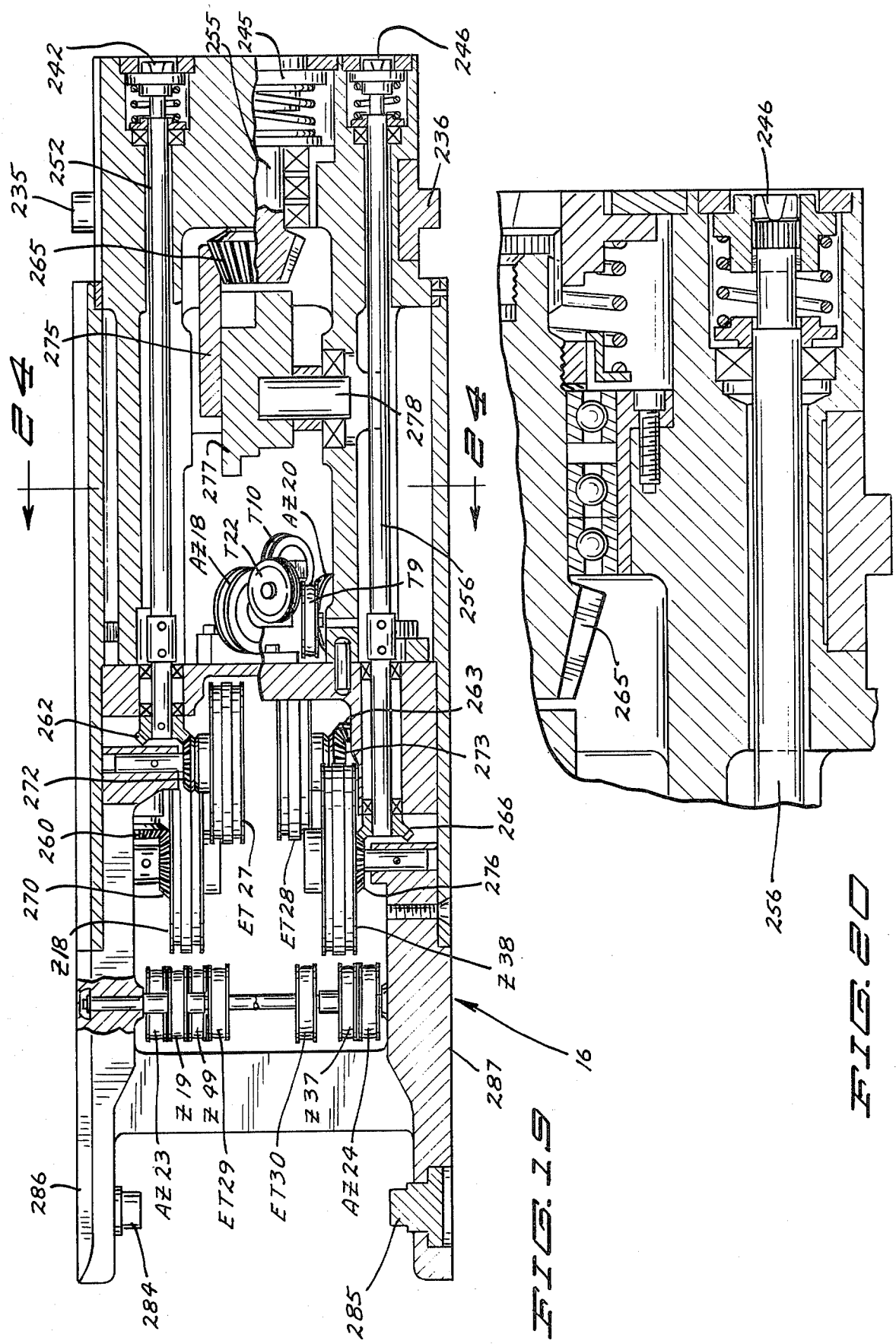

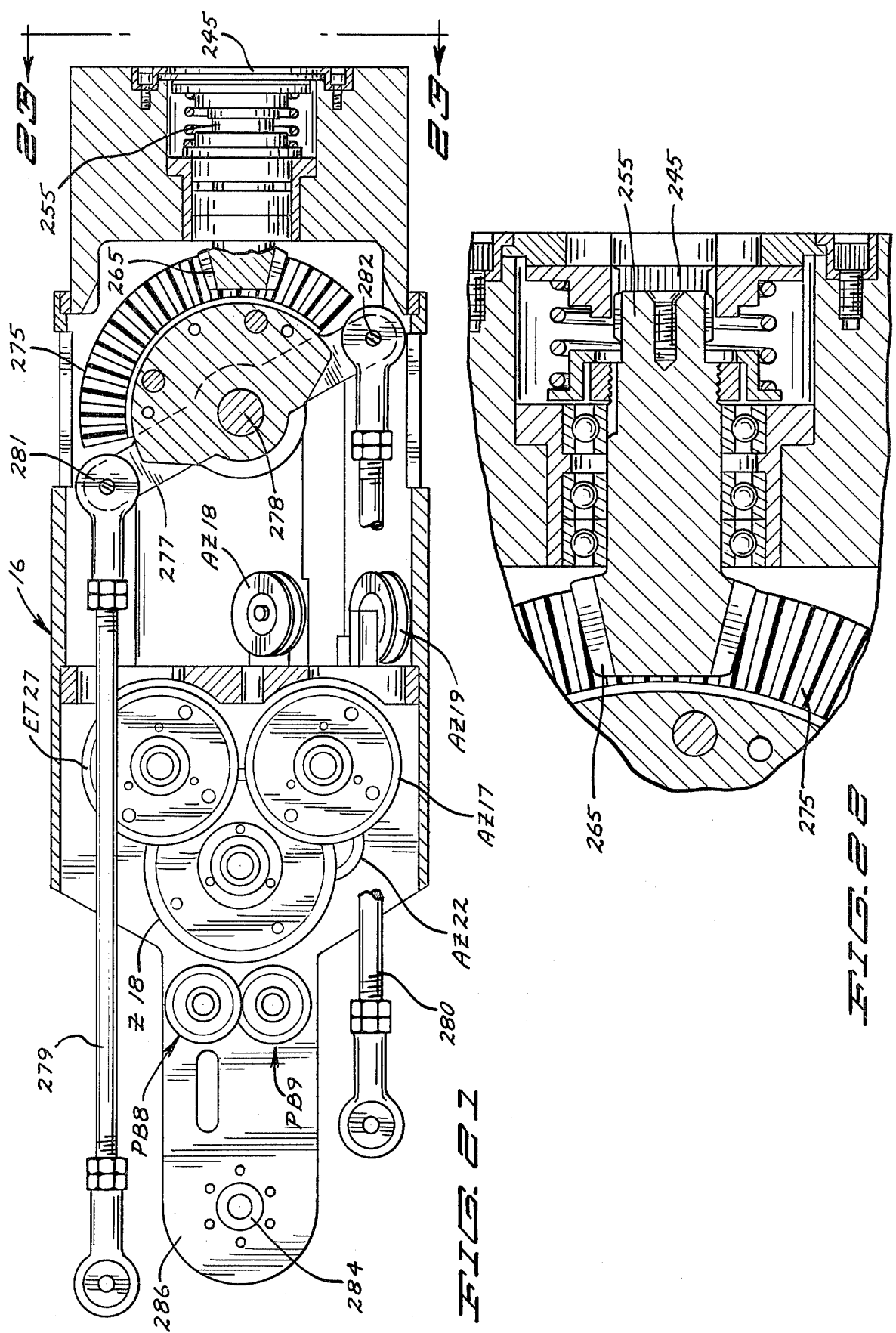

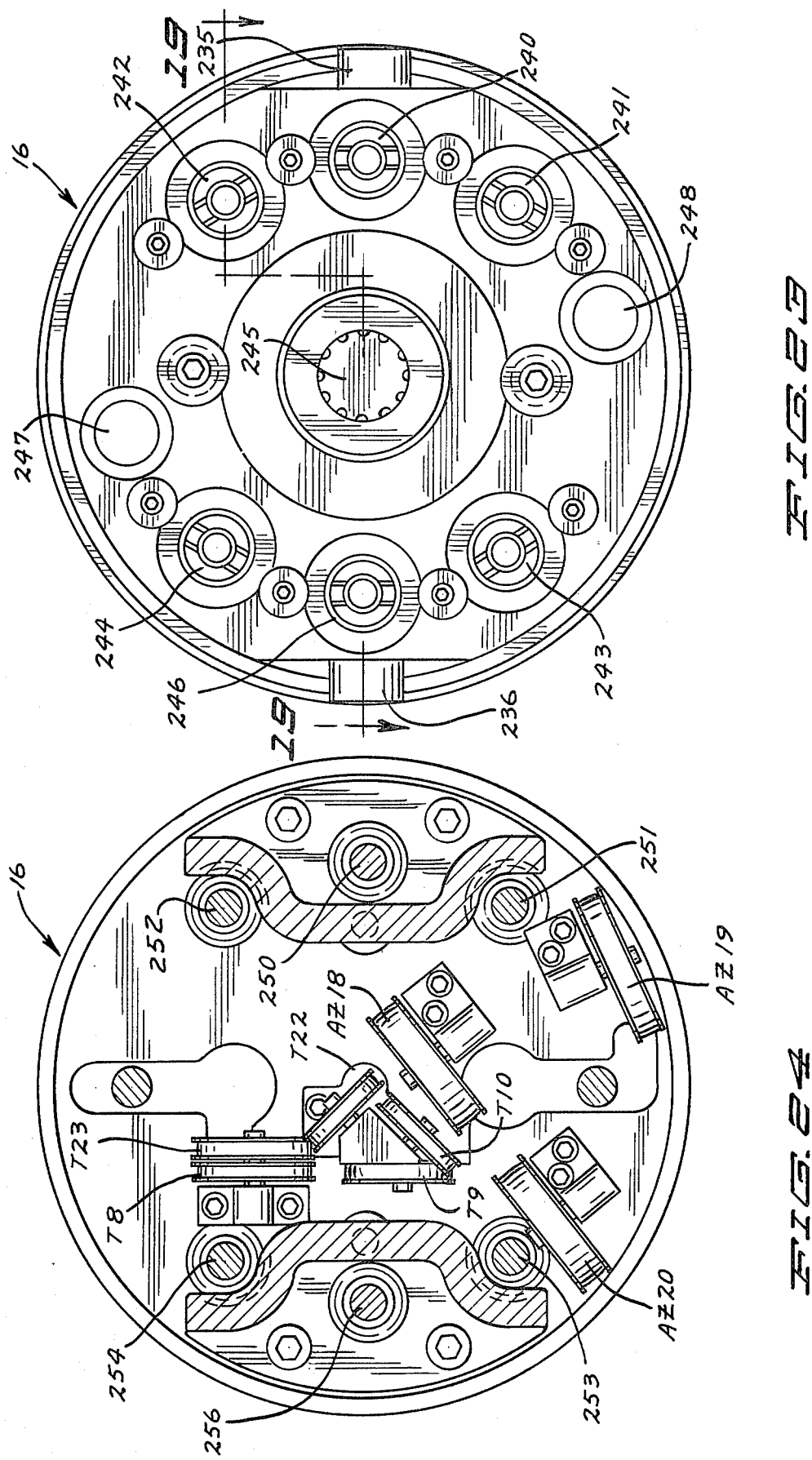

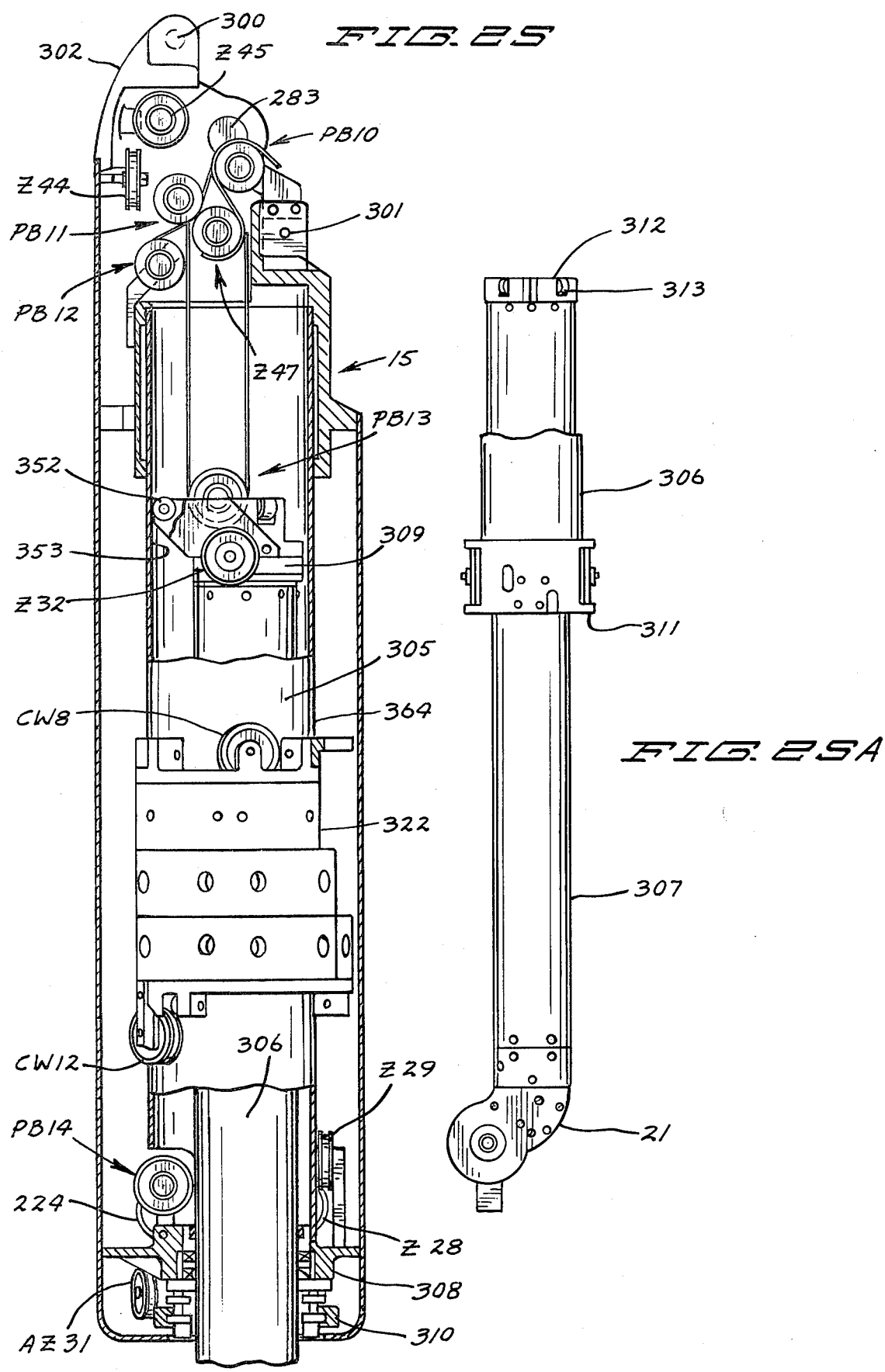

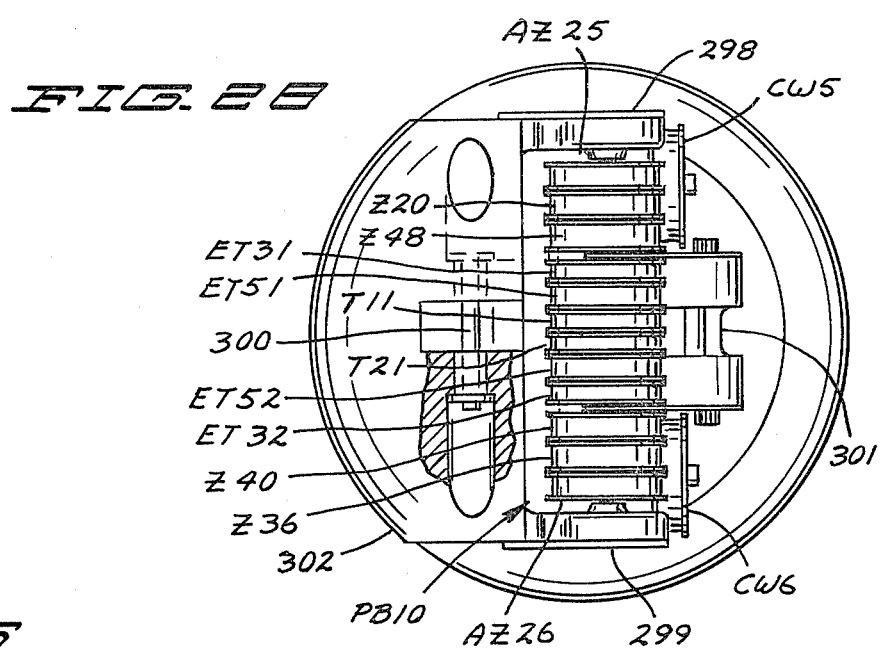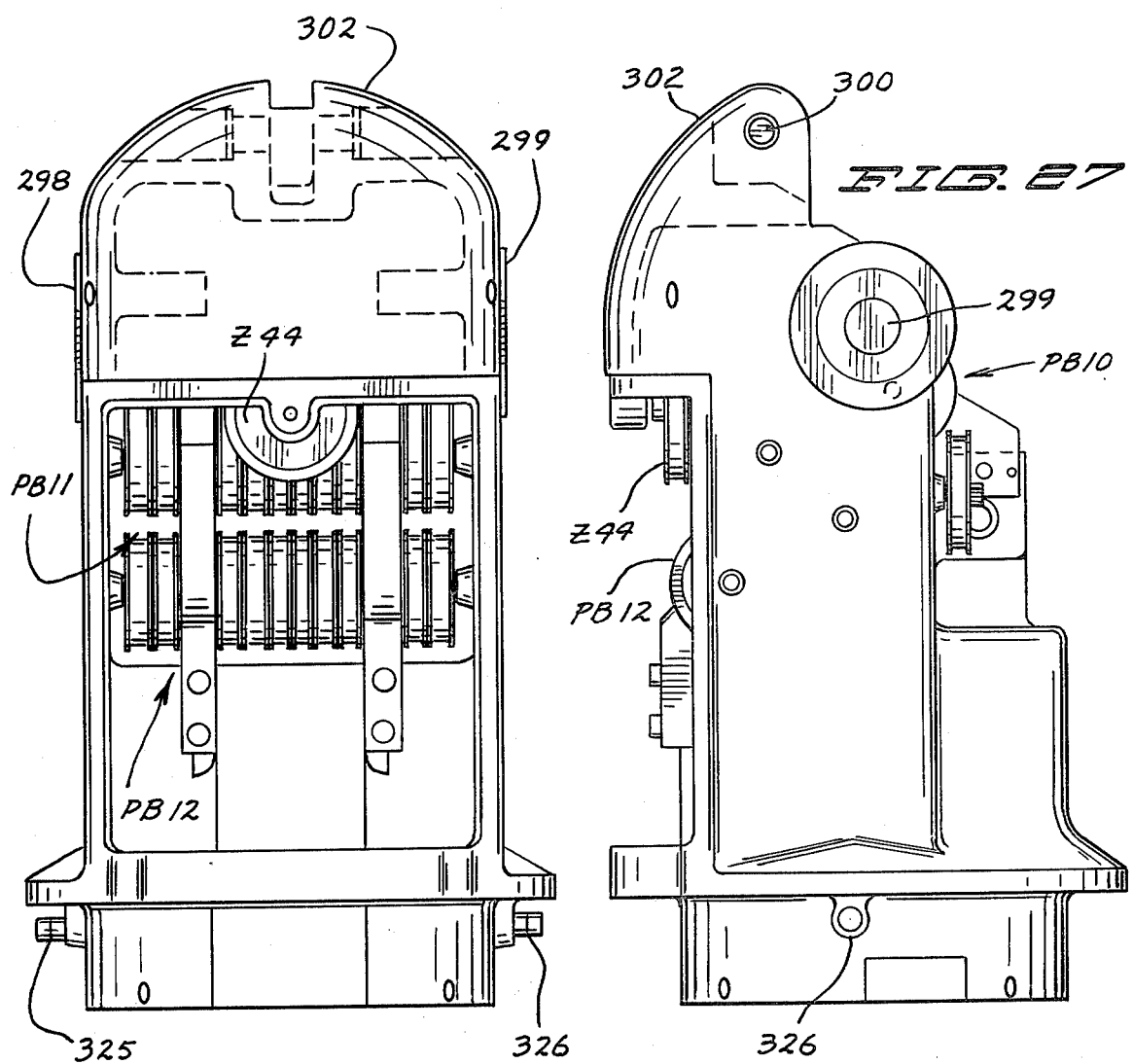

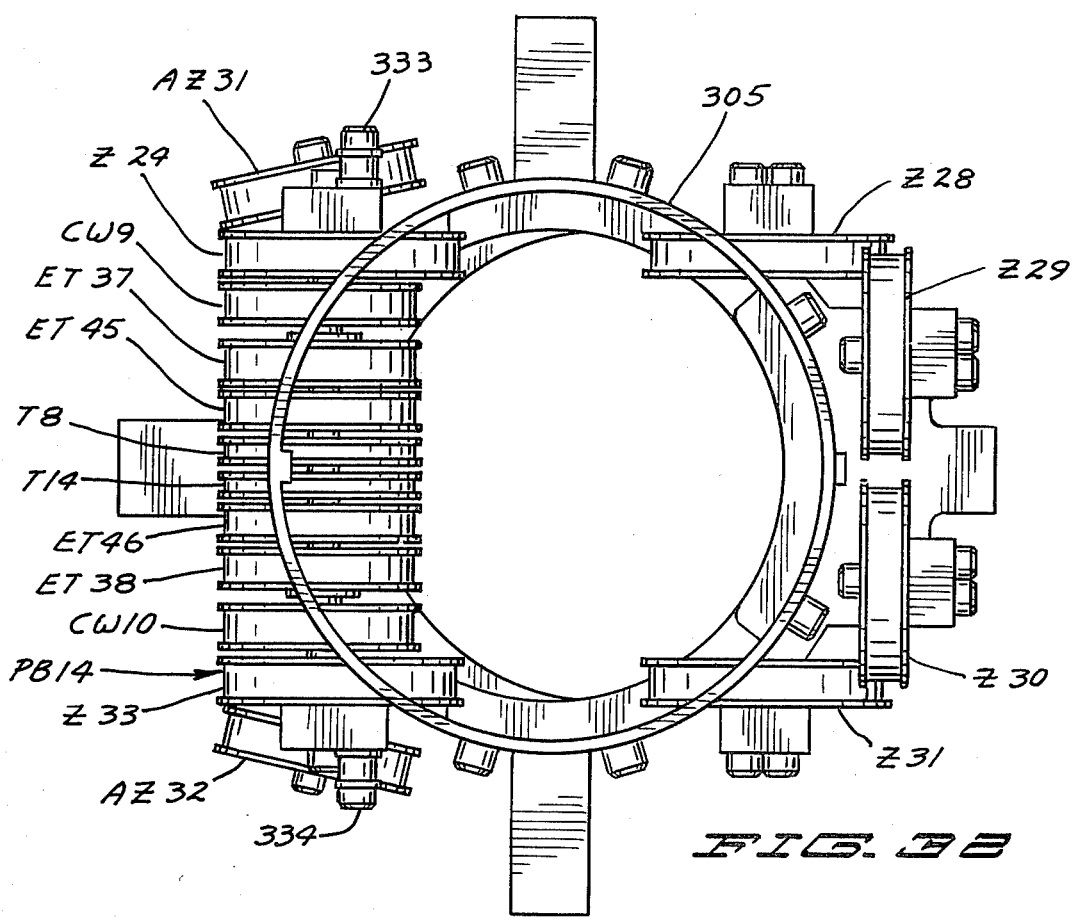
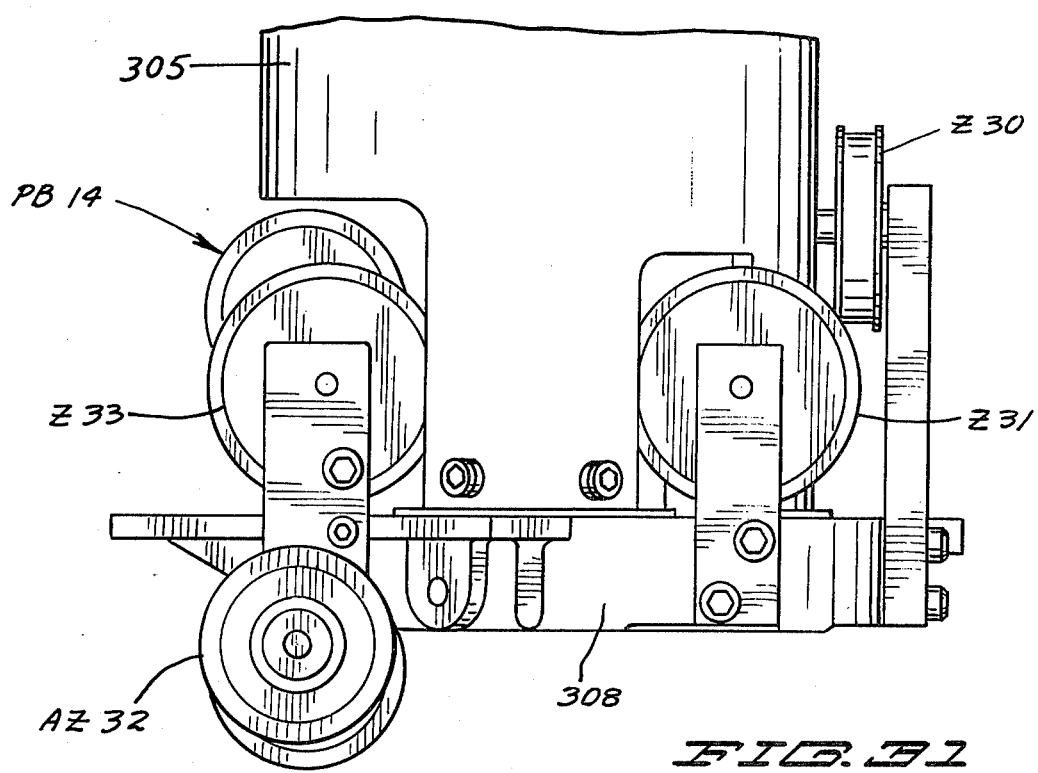

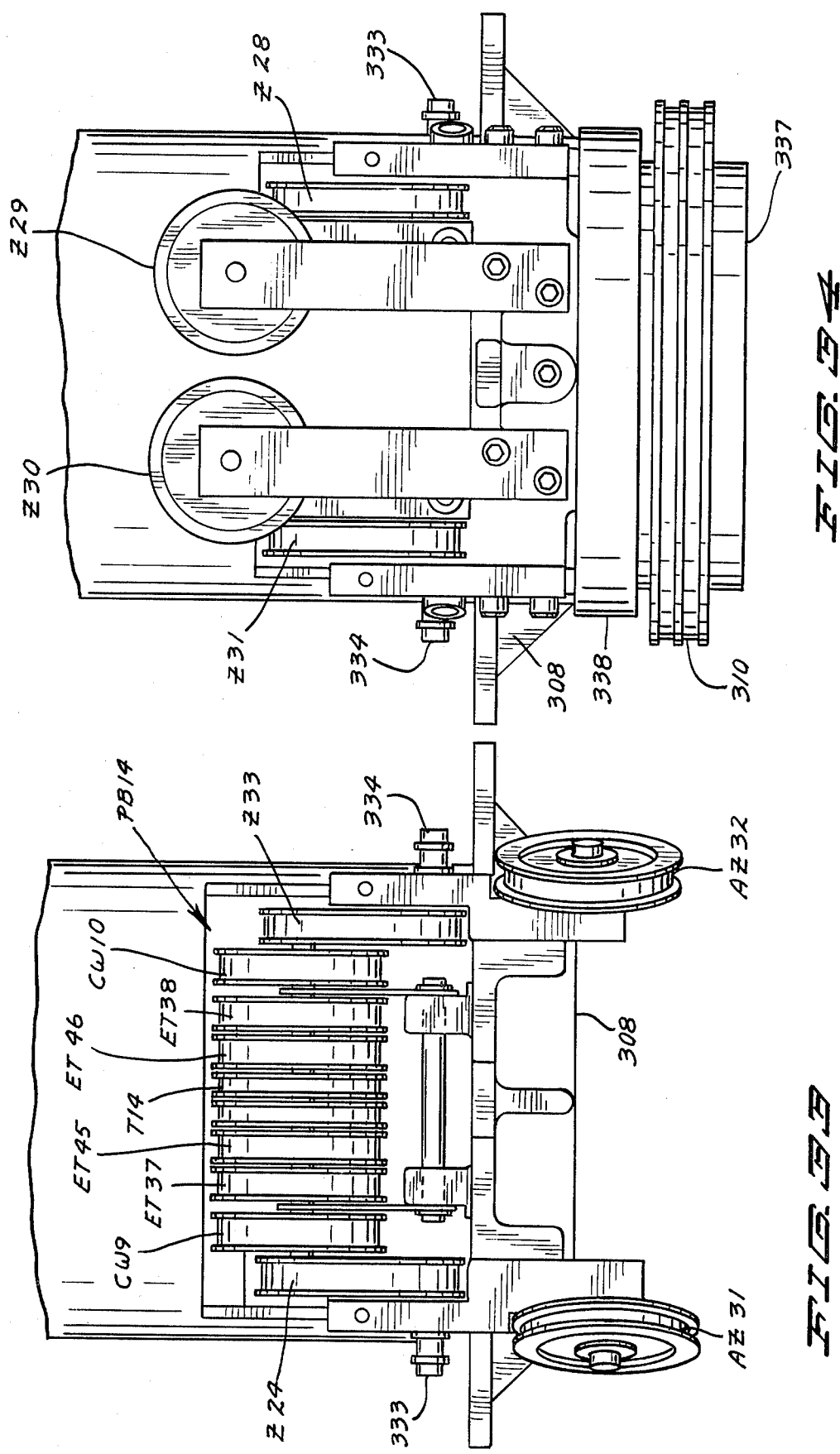

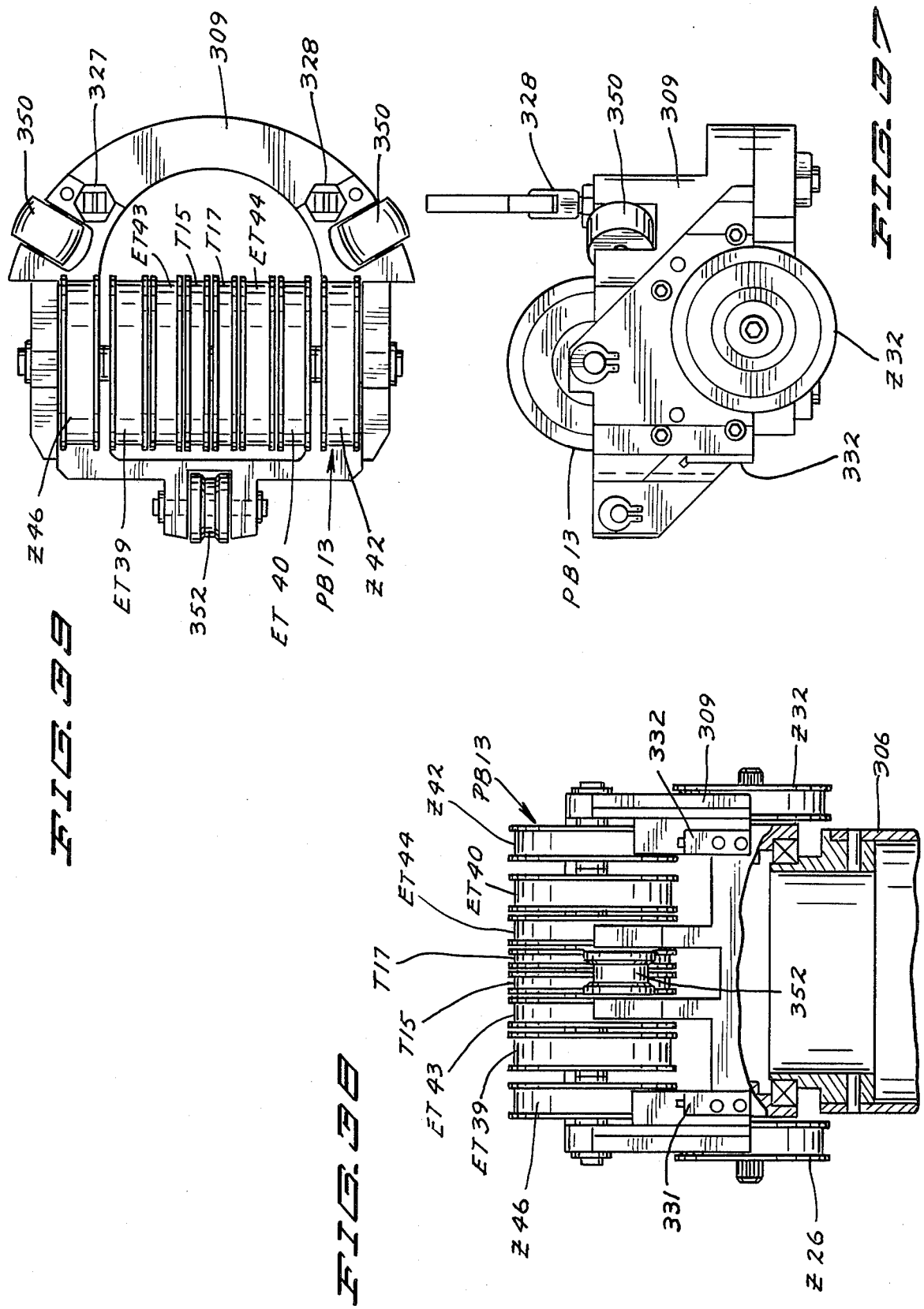

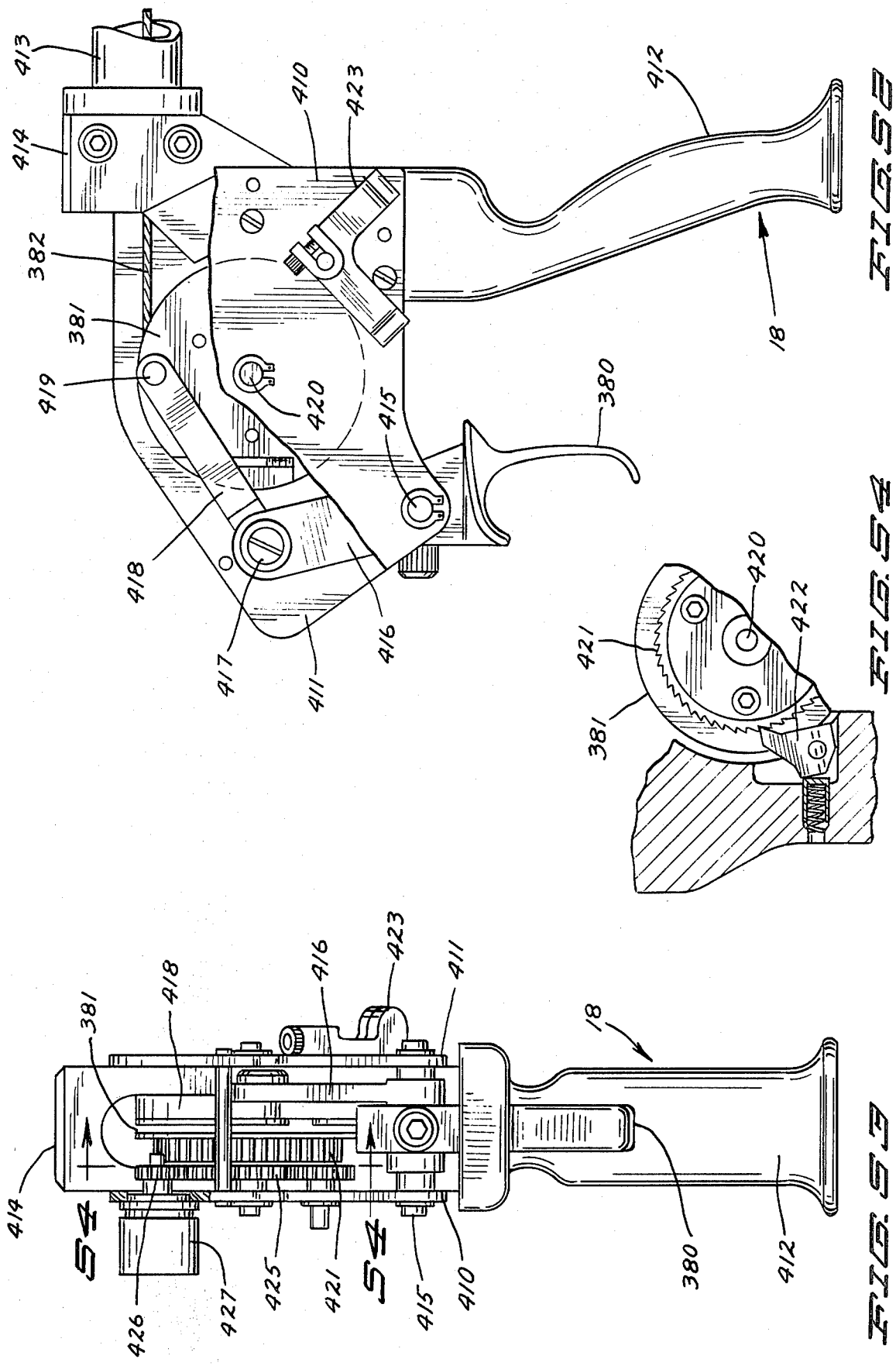

MASTER-SLAVE MANIPULATOR

BACKGROUND OF THE INVENTION

1. Field of the Invention

This invention relates to remote control master-slave manipulators of the type by which an operator on one side of a protective barrier wall engages a handle in movements which are reproduced in a tong or other tool on the opposite side of the barrier wall. The role of such manipulators in the nuclear industry has changed from relatively simple laboratory instruments to workhorses of the industry. Emphasis has shifted from simple remote handling capability to considerations for overall manipulator performance including decontamination and maintenance considerations, higher manipulator handling capacities, reliability considerations, and overall operating efficiency. The present invention is directed to a manipulator which satisfies the demands imposed by this new role and at the same time includes considerations for exchangeability with existing manipulator systems allowing retrofitting of existing facilities with the manipulator according to the present invention.

2. The Prior Art

In the past thirty years or so, master-slave manipulators have evolved from simple mechanical devices capable of basic movements and functions to highly sophisticated systems of greatly enhanced capability and efficiency. Early improvements included "Y" motion indexing to extend the forward reach of the manipulator and to facilitate installation, lateral rotation or side canting of the slave arm relative to the master arm, and "Z" motion extension by which the length of the slave arm is increased relative to the master arm. Systems have been developed for translation of linear movements into rotary motions for transfer through rotary seals in order to insure safe separation of the operator's environment and that of the work area. Specific improvements have been made in handles, wrist joints, tong mechanisms, and the like.

SUMMARY OF THE INVENTION

Broadly stated, the present invention is directed to a remote control master-slave manipulator for performing work on the opposite side of the barrier wall. In common with similar manipulators, it comprises a rotatable horizontal support extending through a barrier wall. A longitudinally extensible master arm is pivotally connected to one end of the horizontal support so as to be rotatable therewith, and a longitudinally extensible slave arm is pivotally connected to the opposite end of the horizontal support to be rotatable therewith. The manipulator may be sealed to prevent passage of contaminants from one side of the barrier wall to the other. In this case, the horizontal support includes a rotatable seal tube extending through the wall, a master transfer assembly secured to the seal tube at one end, and a slave transfer assembly secured to the seal tube at the opposite end. Where sealing is unnecessary for safety, an unsealed horizontal through tube is used.

Within the horizontal support there are means for translating linear motion generated by movement of the handle on the master arm into rotary motion for transfer through the barrier wall and then retranslating to linear motion to reproduce the movements of the handle in the tong at the end of the slave arm. The master transfer assembly comprises a generally cylindrical housing closed at one end and abutting the through tube. Pivot means support the master arm at the opposite open end. To transmit squeezing action of the operator on the master arm handle to the slave arm tong and to amplify the force of that squeezing action, a longitudinal shaft is journaled for rotation within the master transfer assembly. That shaft is interconnected through gears with a rotary drum for translating linear motion generated by the squeezing action of the operator into rotary motion. A motor also responsive to that squeezing action is also interconnected through gear means to the rotary drum. Potentiometers mounted on the handle and coupled to the tong drive motor for indicating the squeezing positions of the handle and tong are interconnected through a differential to the motor to balance the squeezing forces.

For transmission of Y motion, a further longitudinal shaft is provided which is interconnected through gears with a rocker arm coupled by link means to the master arm. Oppositely movable Y motion counterweights are driven through gearing by that Y motion shaft. The manipulator is also characterized by a motor driven assist to extend the slave arm longitudinally in Z motion.

BRIEF DESCRIPTION OF THE DRAWINGS:

The manipulator according to the present invention is illustrated in the accompanying drawings in which like numerals refer to corresponding parts and in which:

FIG. 1 is an elevation, partly in section and partly broken away, showing the manipulator mounted in a protective barrier wall;

FIG. 3 is a similar right side elevation of the master arm subassembly;

FIG 4 is a fragmentary elevation on an enlarged scale of the wall side of the master arm assembly, generally on the line 4—4 of FIG. 3 and in the direction of the arrows;

FIG. 5 is a left hand elevation of the master transfer and rotary counterweight assembly of the manipulator;

FIG. 10 is a schematic representation of a gear train compensating for lateral rotation as affects tong operation;

FIG 14 is a fragmentary side elevation showing the slave end of the seal tube assembly which extends through the barrier wall;

FIG. 15 is a horizontal section through the seal tube on the longitudinal axis thereof;

FIG. 16 is a vertical section through the seal tube on the line 16—16 of FIG. 17 and in the direction of the arrows;

FIG. 16A is a schematic fragmentary cross section through a "Ferro-Fluidic" rotary shaft seal;

FIG. 16B is a section on the line 16B—16B of FIG. 18 and in the direction of the arrows;

FIG. 17 is an end elevation of the slave arm end of the seal tube assembly;

FIG. 18 is an end elevation of the master arm end of the seal tube assembly;

FIG. 19 is a horizontal section through the slave transfer assembly on line 19—19 of FIG. 23 and in the direction of the arrows;

FIG. 20 is a fragmentary horizontal section on an enlarged scale showing a typical coupling for connecting the slave Z motion indexing transfer to the seal tube;

FIG. 21 is a vertical section through the slave transfer assembly on the longitudinal axis thereof;

FIG. 22 is an enlarged fragmentary section showing details of the mechanism for transfer of Y motion from the seal tube;

FIG. 23 is an end elevation (operator's view) of the slave transfer assembly;

FIG. 24 is a section on the line 24—24 of FIG. 19 and in the direction of the arrows;

FIGS. 25 and 25A are a left side elevation of the slave arm assembly (from the operator's point of view), shown partly in section and partly broken away;

FIG. 26 is a rear (cell side) elevation of the slave pivot assembly;

FIG. 27 is a left hand elevation thereof;

FIG. 28 is a top view thereof;

FIG. 31 is a left side elevation of the slave azimuth assembly;

FIG. 32 is a top view thereof;

FIG. 33 is a rear (cell side) elevation thereof;

FIG. 34 is a front (operator's view) elevation thereof;

FIG. 37 is a left side elevation of the intermediate slave carriage assembly;

FIG. 38 is a rear (cell side) elevation thereof;

FIG. 39 is a top view thereof;

FIG. 49A is a further schematic view showing the power assist principle;

FIG. 52 is a left hand elevation of a preferred form of handle means shown partly broken away to reveal hidden structure;

FIG. 53 is a rear elevation thereof; and

FIG. 54 is a fragmentary section on an enlarged scale on the line 54—54 of FIG. 53 and in the direction of the arrows.

DETAILED DESCRIPTION OF THE PREFERRED EMBODIMENT

Figure 2:
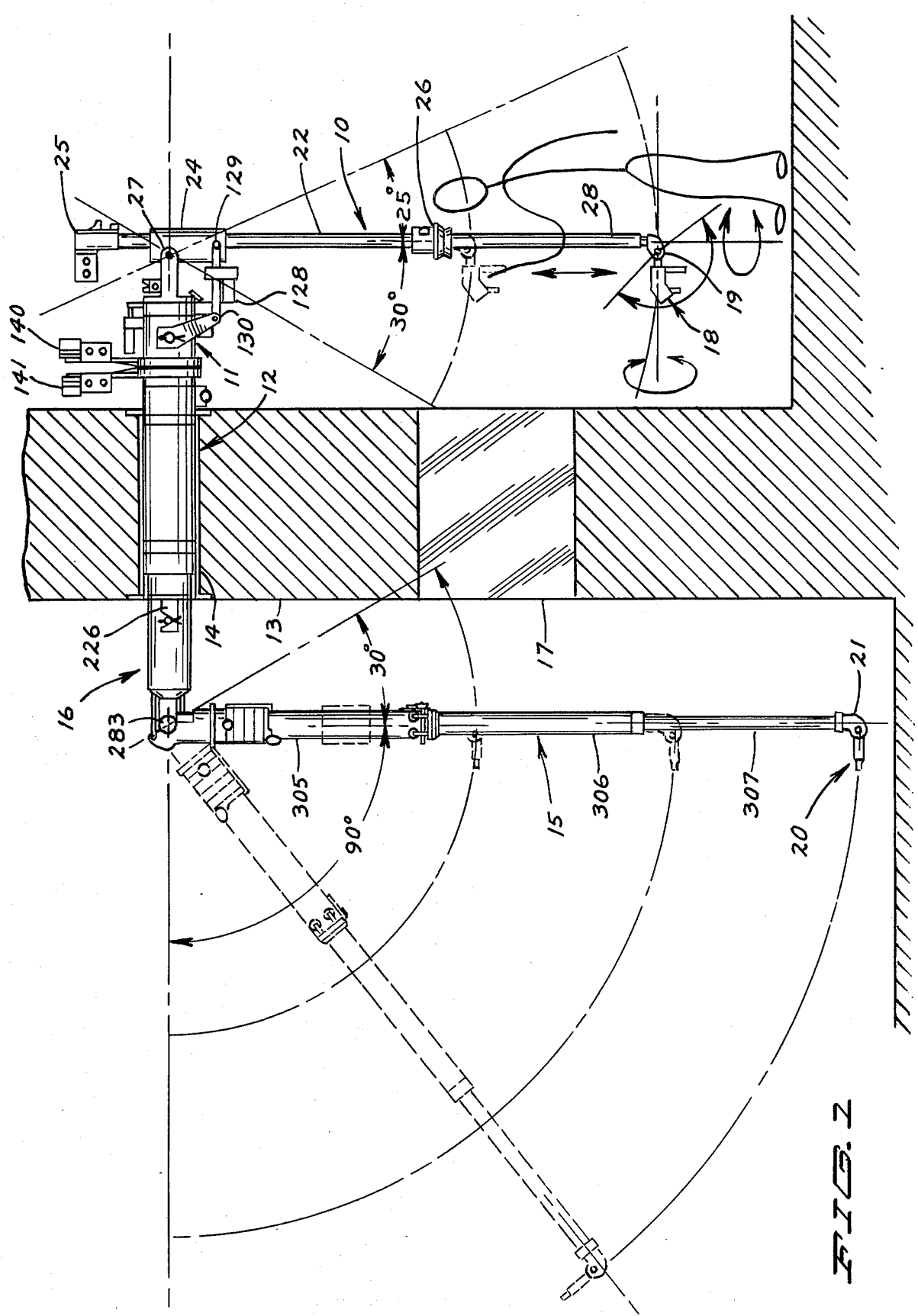
FIG. 2 is a front elevation, from the operator's point of view, of the master arm subassembly of the manipulator shown partly in section and partly broken away.
Figure 6:
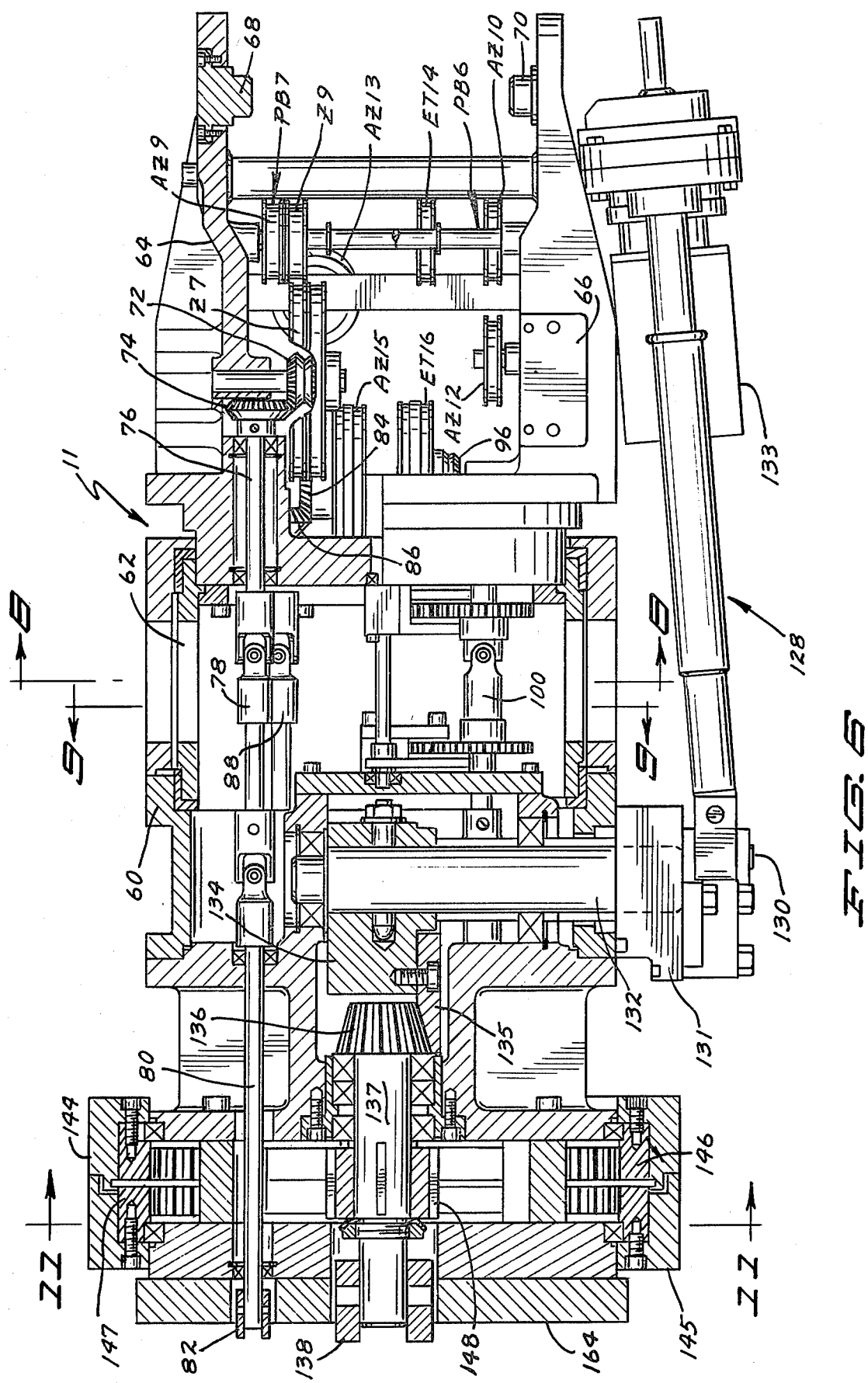
FIG. 6 is a plan view, partly in horizontal section on the line 6—6 of FIG. 5 and in the direction of the arrows, of the master transfer and rotary counterweight assembly.
Figure 7:
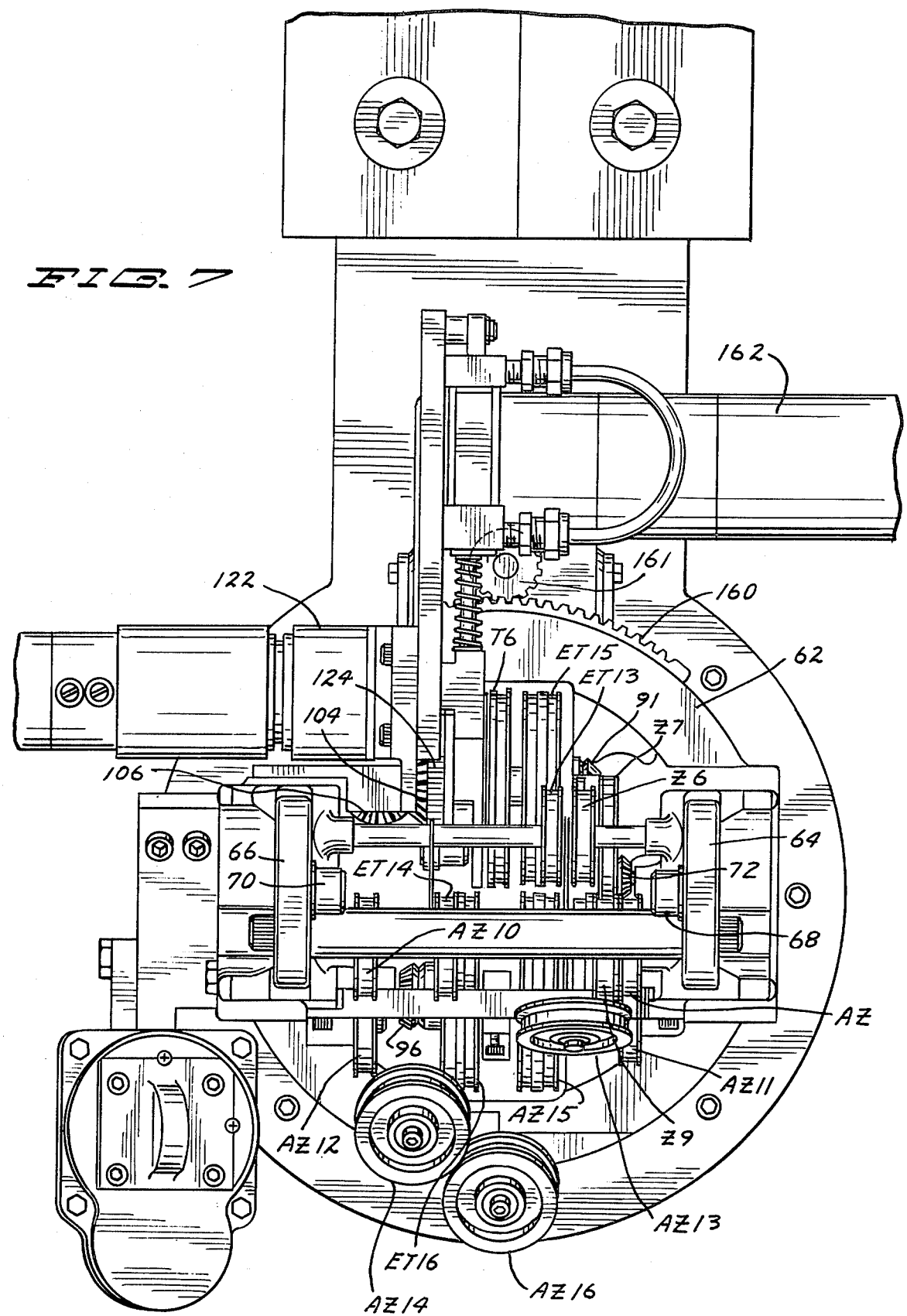
FIG. 7 is a front elevation (operator's view) of the master transfer and rotary counterweight assembly.

Throughout this application the manipulator is described and illustrated in terms of a single horizontal support with a single master arm and a single slave arm. It is to be understood, however, that in virtually all instances the manipulators are employed in laterally spaced pairs so that the operator, by the use of two master control arms, is able to manipulate two slave arms in order to reproduce the action of a pair of hands in the remote area on the opposite side of the barrier wall. Although illustrated and described with reference to a sealed manipulator, sealing is not an essential feature of the invention.

General Arrangement of Parts (FIG. 1)

Referring now to the drawings, and particularly to FIG. 1, the remote control master-slave manipulator according to the present invention comprises generally a master arm assembly, indicated generally at 10, connected through a master transfer assembly, indicated generally at 11, to a horizontal seal tube assembly, indicated generally at 12. The seal tube assembly 12 functions, along with master and slave transfer assemblies, as a horizontal support for the master and slave arms and extends through a generally vertical barrier of shielding wall 13, being mounted therein in a horizontal tube 14 secured so as to be structurally integral with the wall. As shown, although seal tube 12 is rotatable within tube 14, it is fixed in its horizontal position. A slave arm assembly, indicated generally at 15, is pivotally connected to a slave transfer assembly, indicated generally at 16, which in turn is connected to the seal tube assembly 12 on the opposite side of the barrier wall. Wall 13 is provided with a window 17 of approximately the same thickness as the wall.

A handle, indicated generally at 18, is secured to the wrist joint 19 at the lower end of the master arm assembly. A tong, indicated generally at 20, or other working tool, is secured to the wrist joint 21 at the lower end of the slave arm. In normal non-operating position, the master arm 10 and the slave arm 15 are balanced to hang generally vertically. The master arm assembly 10 with its transfer assembly 11, the slave arm assembly 15 with its transfer assembly 16, and the seal tube assembly 12, are all completely separable units. These units are standardized and are interchangeable with different corresponding units in the event of failure or contamination of one or two of these units making up the manipulator, without the necessity of replacing all of the manipulator units. Connections are made through rotary mechanical couplings at the interface between adjacent units.

As indicated in FIG 1, the slave arm 15 may be indexed forwardly or backwardly (in Y motion) relative to the master arm. The extended length of the slave arm (Z motion) can be indexed relative to the master arm. Also, as in Jelatis et al U.S. Pat. No. 2,888,154, the slave arm may be indexed laterally (X motion) to right or left relative to the master arm.

The Master Arm (FIGS. 1–3 and 46–51)

The master arm assembly includes a relatively stationary part or trunk tube comprising a pair of spaced apart parallel tubular guides 22 supported in an intermediate pivot frame 24 and secured at their respective ends in a top bracket 25 and bottom bracket 26. This relatively stationary part of the master arm is pivotally connected at 27 to the master transfer assembly 11 forming part of the horizontal support for the manipulator. The master arm also includes a relatively movable part comprising a boom tube 28 which is longitudinally reciprocable relative to the stationary part of the arm. The lower end of the movable boom tube carries a wrist joint which may be the type illustrated and described in Haaker U.S. Pat. Nos. 3,503,273, 3,543,592 and 3,543,593. The master wrist joint is adapted to be fitted with a handle as described hereinafter in greater detail.

The top end of boom tube 28 carries a guide bracket 30 rotatably secured to the boom tube. Guide bracket 30 is provided with a plurality of rollers 32 which engage tubular members 22 of the trunk tube and guide the boom tube in its reciprocal movement. Boom tube 28 is guided for axial movement in an azimuth assembly 34 carried by the bottom bracket 26 of the master trunk tube. A double track tape ring or pulley 36 is rotatably secured to the azimuth assembly and rotates in response to rotation of the boom tube 28. The structure of the master azimuth assembly resembles that of the corresponding assembly on the slave arm which is described in greater detail hereinafter.

As is now well understood in the art, each of two tapes is anchored to the ring 36 extending in opposite directions such that as one tape is wound about the ring, the other tape is correspondingly unwound. These tapes engage azimuth pulleys Az1 and Az2 mounted on the azimuth assembly and extend upwardly along the front of the master arm for transmission of the rotational movement of the master arm boom tube to the slave boom tube, as explained in greater detail hereinafter.

The azimuth assembly carries a bank of eight pulleys PB1 of the same size rotatable about a common axis for engaging tapes associated with transmission of tong motion, elevation and twist motions, and Z motion, all of which are identified in Table I.

Figure 46:
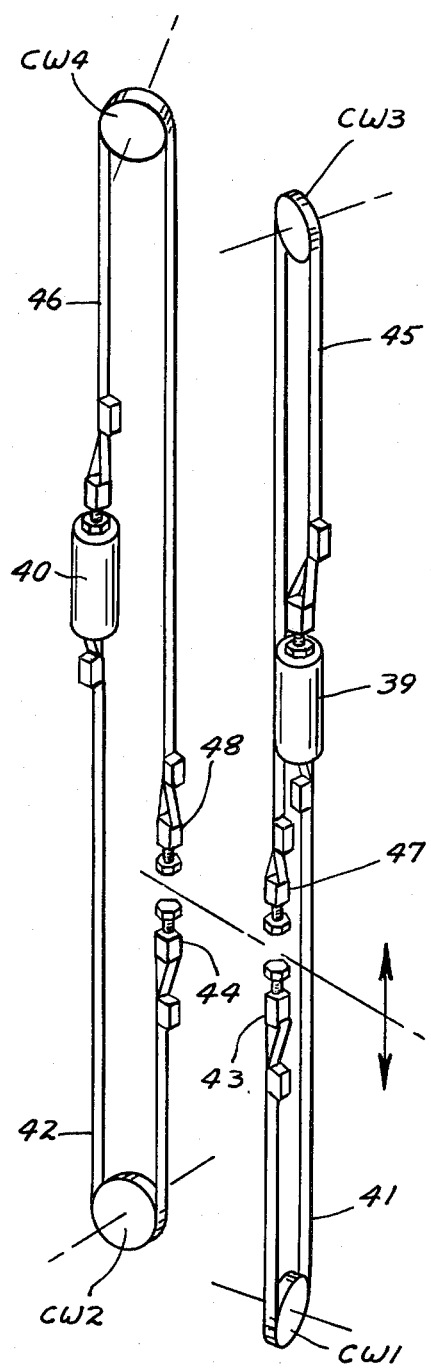
FIG. 46 is a schematic perspective view showing how the boom tube of the master arm of the manipulator is counterbalanced for movement relative to the trunk tube.

As best seen in conjunction with FIG. 46, the boom tube 28 is counterbalanced by counterweights 39 and 40 which are suspended within tubular guides 22 for movement opposite to the direction of movement of the boom tube. Tape 41 extends from an anchorage 43 in guide bracket 30 at the top of the boom tube, around pulley CW1 to counterweight 39. Tape 45 extends from anchorage 47 at the top of the boom tube, over pulley CW3 in top bracket 25 to the counterweight 39. In the same manner, tape 42 extends from anchorage 44 at the top of the boom tube, around pulley CW2 to counterweight 40 and tape 46 extends from anchorage 48 at the top of the boom tube, around pulley CW4 to the top of counterweight 40.

A bank of five pulleys PB2 carrying elevation and twist and tong tapes is supported in a half speed carriage 50 suspended for movement between the top bracket of the master trunk tube and the top of the master boom tube. As best seen in conjunction with FIG. 51, the half speed carriage is suspended by means of tapes 51 and 52, the first of which extends from anchorage 53 in the top guide bracket 30 at the top of the boom tube, around pulley HS1 in the azimuth assembly, HS3 in PB1 upward to HS5 in PB3 at the top of the master trunk tube, downwardly to guide pulley HS7 in the half speed carriage and back upwardly to an anchorage 55 in the trunk tube top bracket. Tape 52 follows a parallel path from anchorage 54 around pulleys HS2, HS4, HS6 and HS8 to anchorage 56. The half speed carriage 50 moves at one half the speed of the boom tube 28.

A bank of ten pulleys PB3 on the operator's side at the top of the master trunk tube top bracket 25 carries various tapes associated with azimuth, elevation and twist, tong and Z motions, and suspension of the half speed carriage, as set out in the Table, and shown in the schematics of the various motions. A further bank of nine pulleys PB4 is mounted on the top of the trunk tube top bracket 25 on the wall side for carrying the tapes associated with the same motions, as identified in the Table. A bank of ten pulleys PB5 (FIG. 4) is mounted on the wall side of the master pivot assembly 24 for directing the paths of the tapes for the same motions, as identified in the Table, into the master transfer assembly.

Master Transfer Assembly (FIGS. 1 and 5–13)

The master transfer assembly, indicated generally at 11, comprises part of the horizontal tubular support of the manipulator. The transfer assembly comprises an outer housing 60, adapted to be fixed to and rotate with the seal tube assembly 12, and an inner housing 62 suitably journaled so as to be rotatable relative to the outer housing 60. Inner housing 62 carries a pair of spaced apart arms 64 and 66, the ends of which carry a pair of studs 68 and 70 on which the master arm assembly 10 is pivotally supported on pivot axis 27.

A pair of pulley banks are supported between arms 64 and 66, the upper tier bank of two pulleys PB6 carrying tapes for elevation and twist and Z motions and the lower tier bank of four pulleys PB7 additionally carrying tapes for azimuth motion, as identified in the Table. A plurality of tape drums ET15 and 16 for transmission of elevation and twist motion, Az15 for transmission of azimuth motion, Z7 for transmission of Z motion and T6 for transmission of tong motion, are journaled in housing 62 between arms 64 and 66. With the exception of tong drum T6 which has a single track, all of the drums are double track having one tape wound in one direction and another tape wound in the opposite direction. Each tape drum is coupled to a bevel gear which meshes with another bevel gear coupled to a horizontal shaft for translation of linear tape motion to rotary motion for transmission through the barrier wall to the slave arm.

Thus, for example, tape drum Z7 is coupled to bevel gear 72. Gear 72 meshes with a further bevel gear 74 coupled to horizontal rod 76 journaled for rotation within housing 62. Shaft 76 is coupled through a flexible universal joint coupling 78 to horizontal shaft 80 journaled for rotation within housing 60 and terminating in a coupling 82 for connection to the seal tube. Similarly, azimuth drum Az15 is coupled to bevel gear 84 which meshes with bevel gear 86 coupled to a horizontal shaft connected through universal joint coupling 88 to a further shaft 89 terminating in coupling 90 for connection to the seal tube. Right hand elevation and twist drum ET15 is coupled to bevel gear 91 for similar transmission of rotary motion through bevel gear 91A, flexible coupling 92 and shaft 93 terminating in end plate coupling 94 and left hand elevation and twist tape drum ET16 is coupled to bevel gear 96 which meshes with bevel gear 98 for similar transmission of motion through flexible coupling 100 and shaft 101 terminating in end plate coupling 102.

Figure 8:
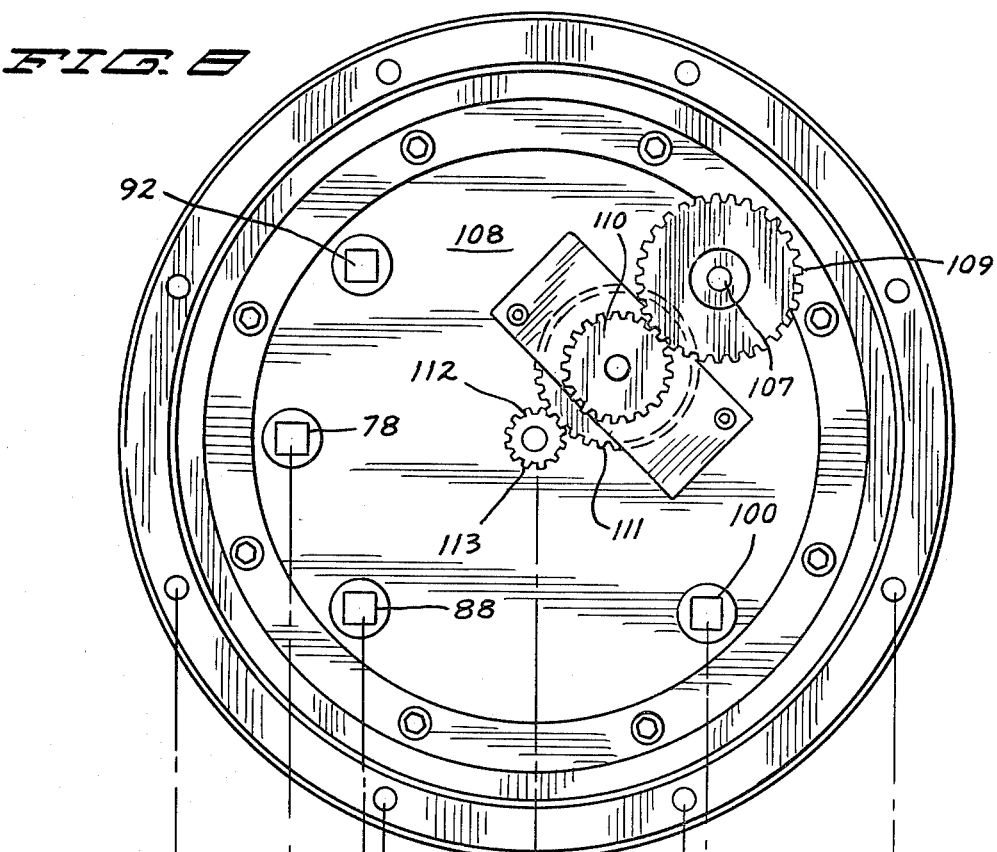
FIG. 8 is a section on the line 8—8 of FIG. 6 and in the direction of the arrows.
Figure 9:
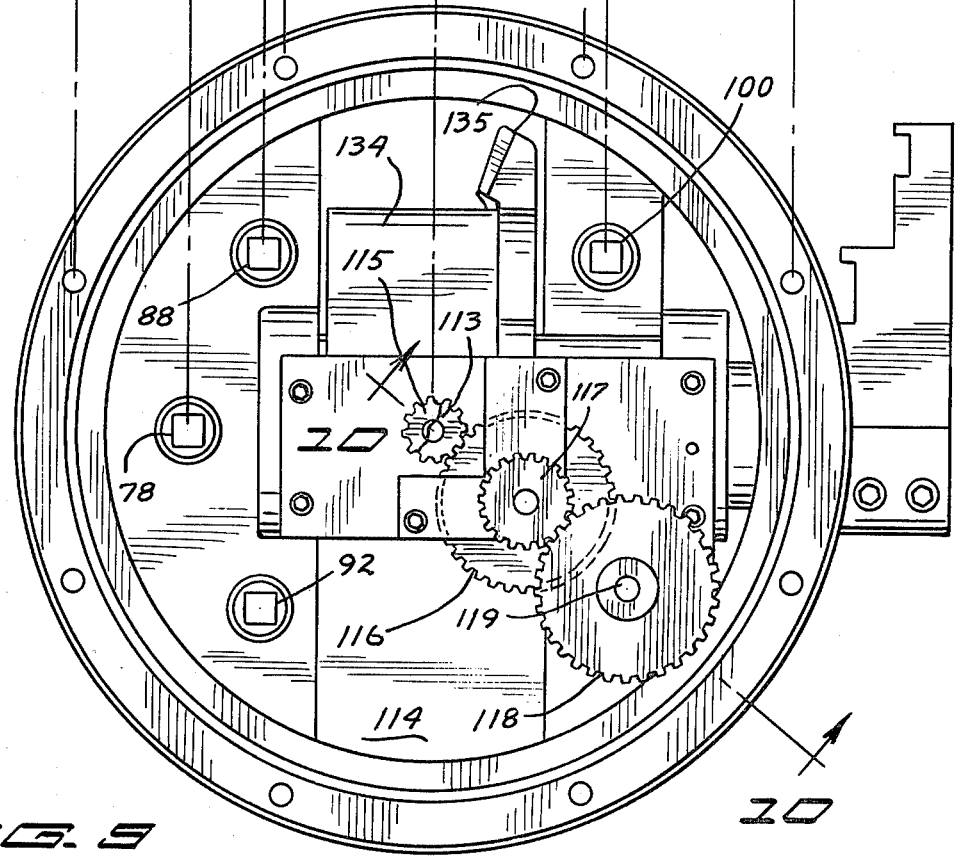
FIG. 9 is a section on the line 9—9 of FIG. 6 and in the direction of the arrows, for convenience shown as a mirror image of FIG. 8 rotated about a horizontal axis.

Tong tape drum T6 is coupled to bevel gear 104 which meshes with bevel gear 106 on shaft 107 journaled in transverse wall 108 of housing 62. To compensate for lateral rotation of the slave arm relative to the master arm caused by rotation of housing 62 relative to housing 60, a compensating gear train, as shown in FIGS. 8, 9 and 10, is provided for transmission of the rotary tong motion through the master transfer assembly. The compensating gear train minimizes undersirable interaction between lateral motion and tong motion, so as to maintain gripping action of the tong, even when the salve arm is undergoing lateral indexing. A gear 109 is secured to the opposite end of shaft 107 on the other side of wall 108 from the bevel gear. Gear 109 meshes with gear 110 coupled for rotation with gear 111, which in turn meshes with gear 112. Gear 112 is carried by shaft 113 which is on the lateral rotation axis. One end of shaft 113 is journaled in transverse wall 108 and the other end is journaled in transverse wall 114 forming part of housing 60. Gear 115 meshes with gear 116 coupled for rotation with gear 117 which meshes with gear 118 carried by shaft 119, the opposite end of which terminates in a coupling 120 for transmission of tong motion to the seal tube.

Ordinarily the tong motion is the result of the squeezing action of the hand of the operator on the handle 18. However, in the preferred form of the present invention, handle 18, as described in greater detail hereinafter in conjunction with FIGS. 52-54, is part of a power assisted grip system described in detail hereinafter.

Pivotal movement of the master arm assembly toward and away from the wall (Y motion) is transmitted through a link, indicated generally at 128, pivotally connected at one end at 129 to the master arm pivot frame 24 and pivotally connected at the other end at 130 to an arm 131 coupled to a shaft 132 journaled for rotation within master transfer housing 60. Link 128 is preferably in the form of a screw actuator driven by electric motor 133. The link is flexibly coupled to compensate for lateral rotation. At the same time, it forms a rigid connection for transmission of movement of the master arm about its pivot 27 to cause corresponding pivotal movement of the slave arm. By actuation of motor 133, the effective length of the link can be increased or shortened to index the slave arm relative to the master arm.

Shaft 132 is coupled to a rocker arm 134 which carries a bevel gear 135 which meshes with a further bevel gear 136 to rotate shaft 137 which terminates in coupling 138 for transmission of Y motion to the seal tube.

Figure 11:
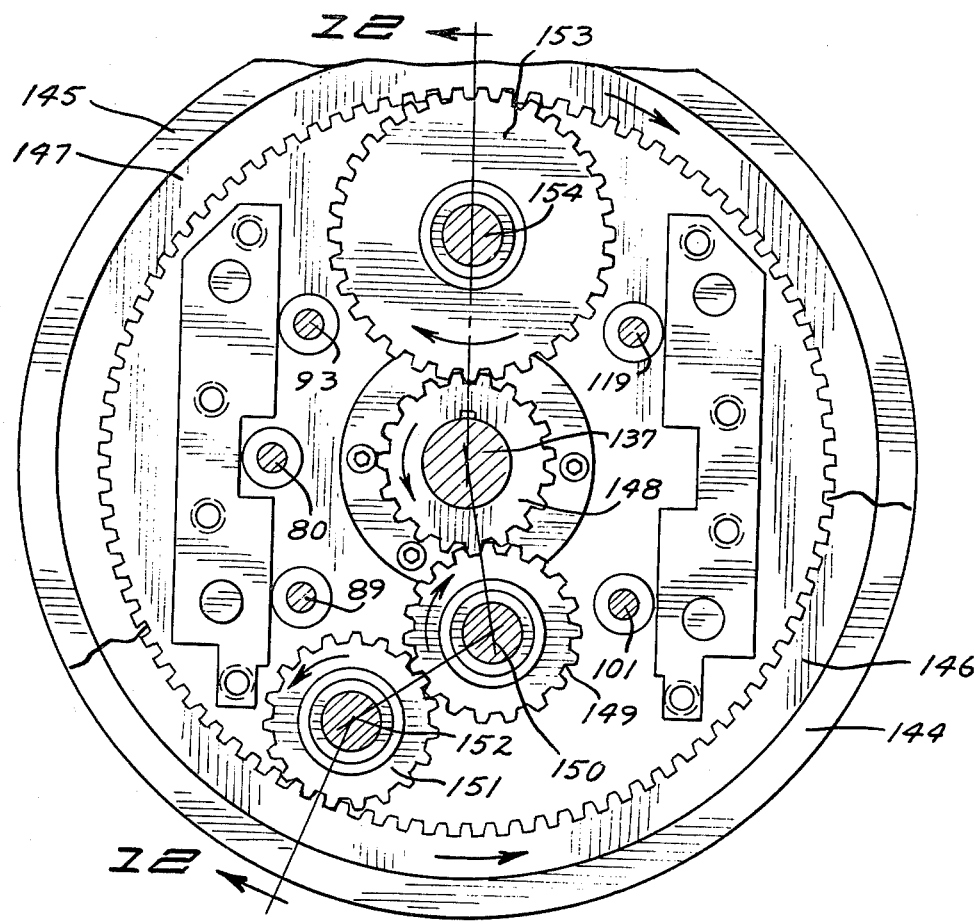
FIG. 11 is a similar section on the line 11—11 of FIG. 6.
Figure 12:
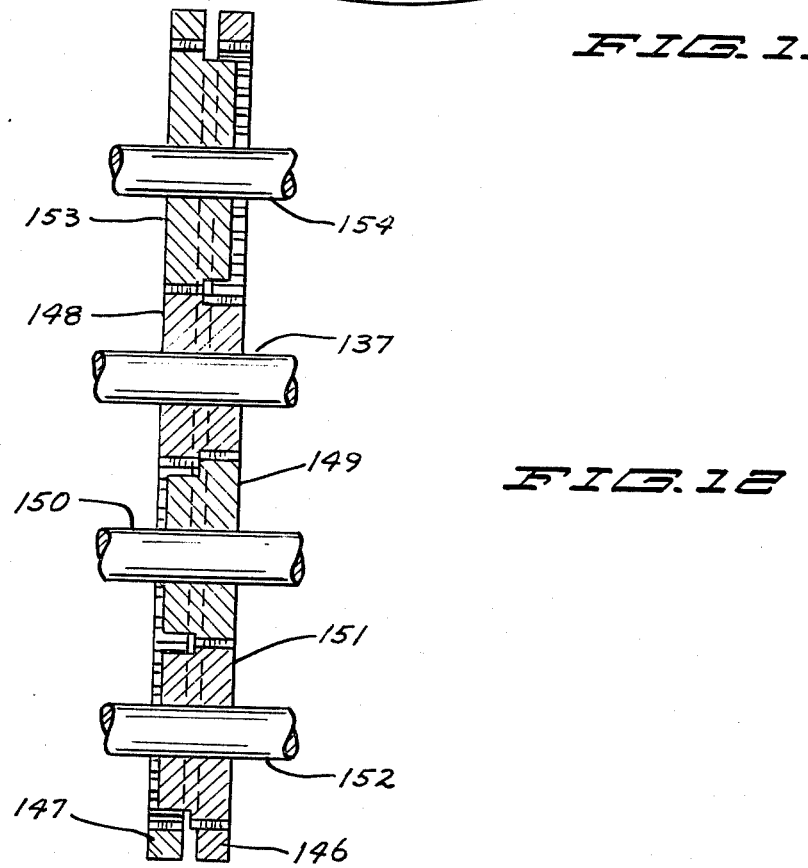
FIG. 12 is a fragmentary section on the line 12—12 of FIG. 11 showing the gear train for operating the rotary counterweights.
Figure 13:
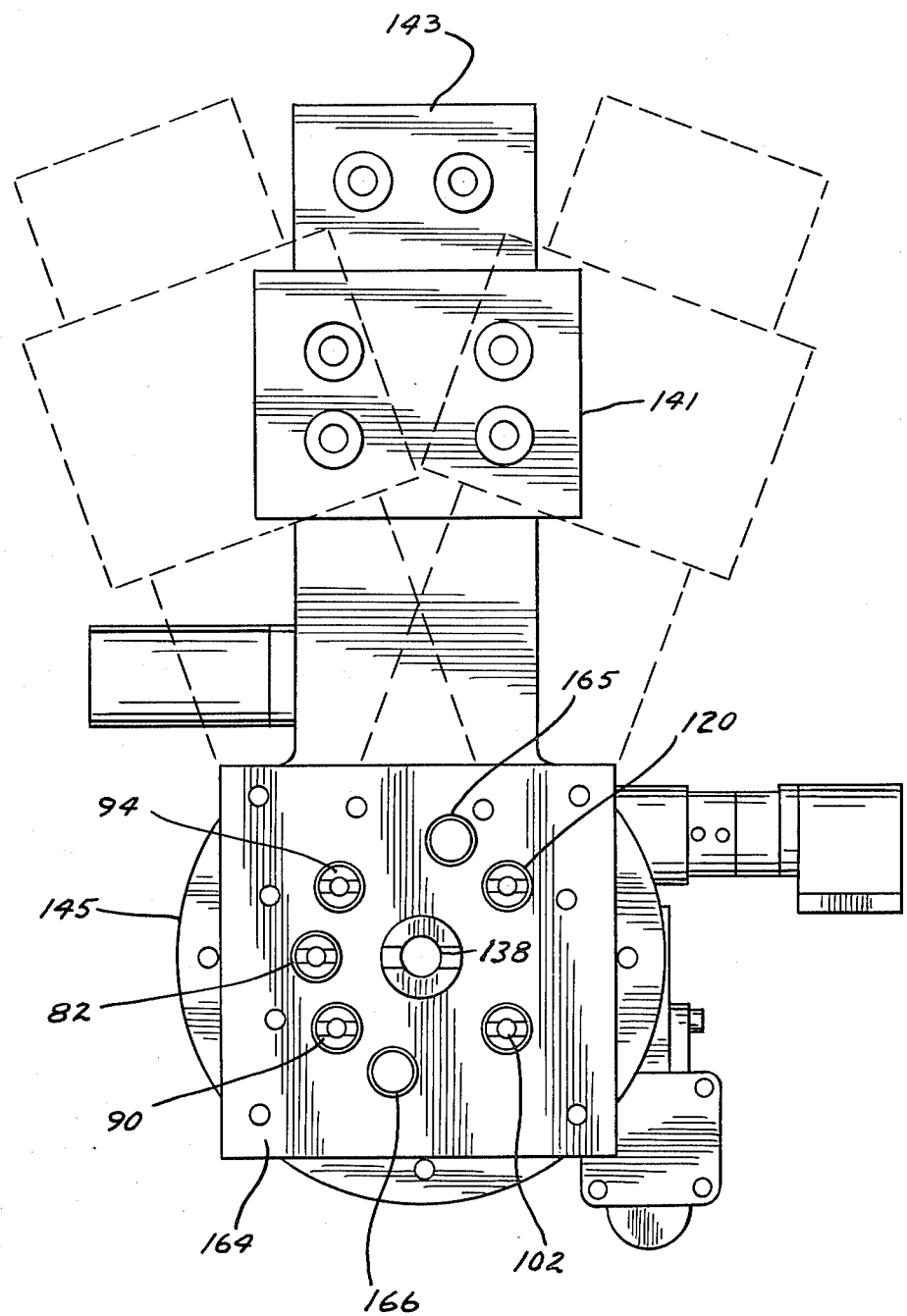
FIG. 13 is an end elevation from the wall side of the master transfer and counterweight assembly.
Figure 29:
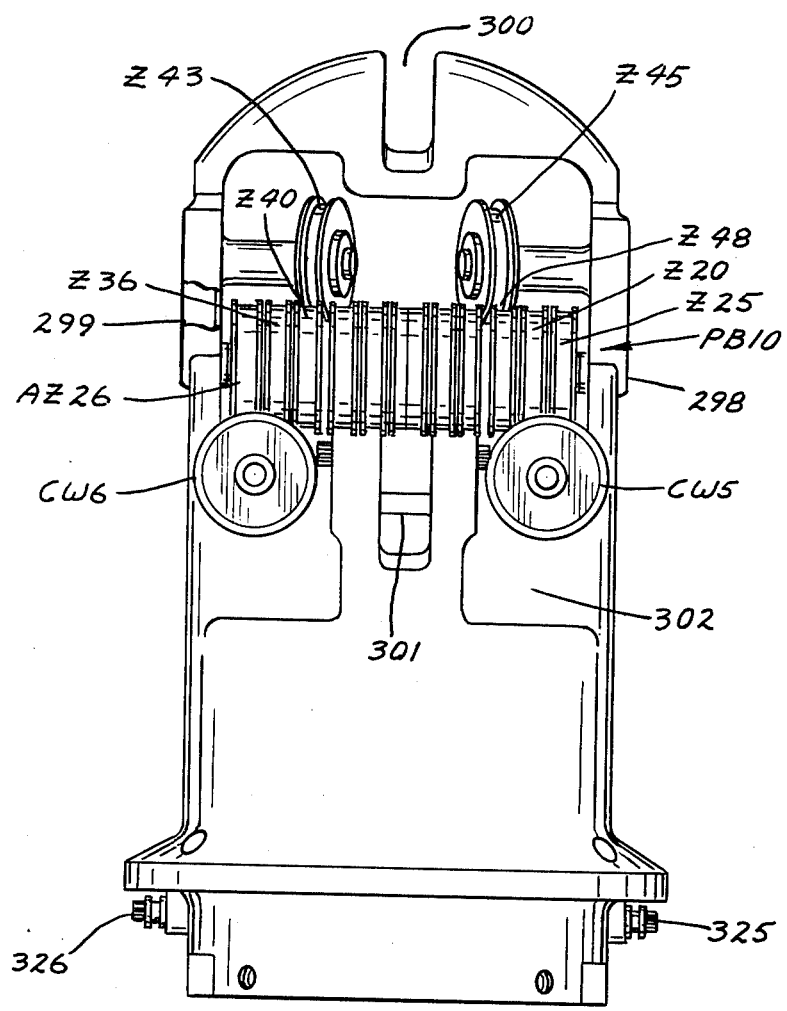
FIG. 29 is a front (operator's view) elevation thereof.
Figure 30:
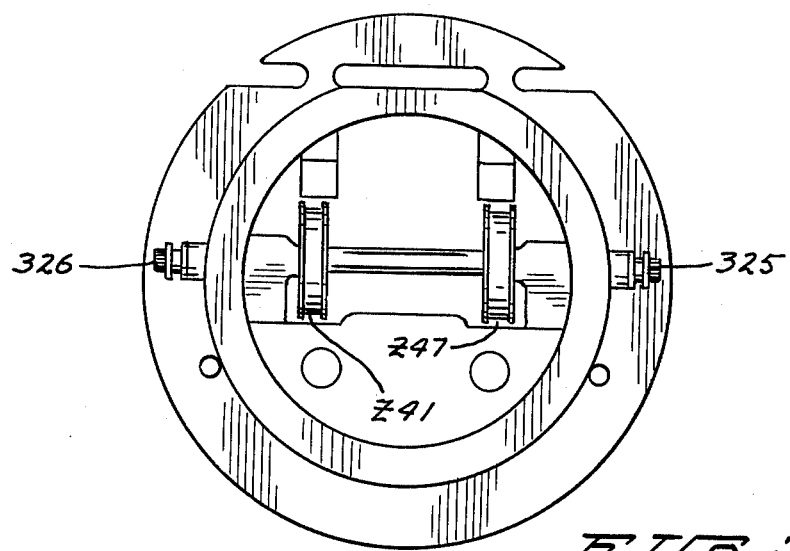
FIG. 30 is a bottom view thereof.
Figure 35:
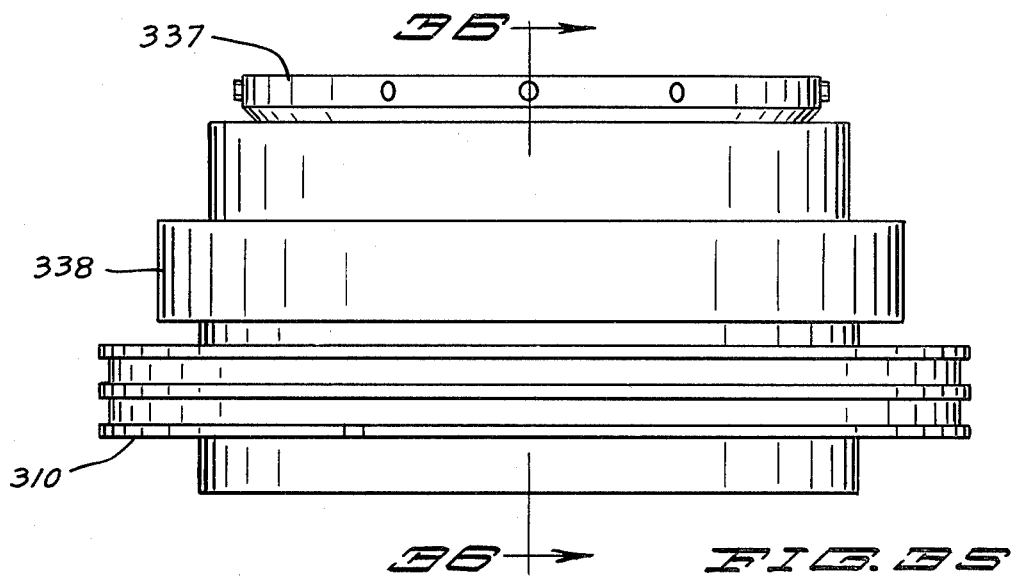
FIG. 35 is an elevation of the slave azimuth rotating body assembly.
Figure 36:
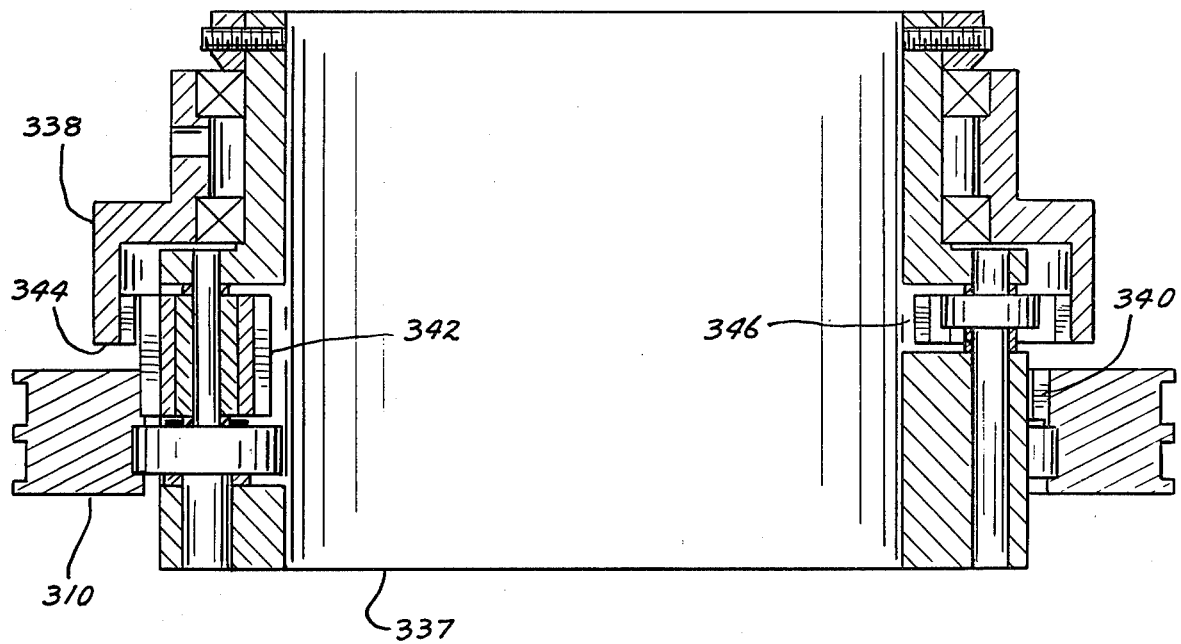
FIG. 36 is a section on an enlarged scale on the line 36—36 of FIG. 35.
Figure 41:
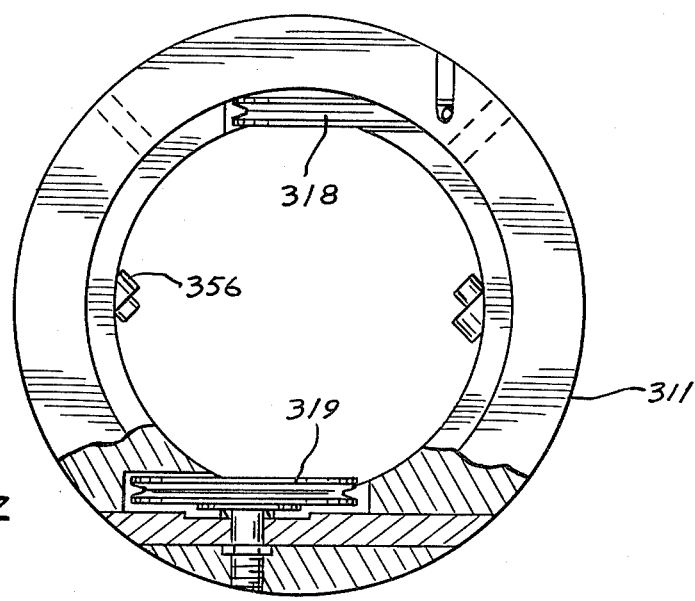
FIG. 41 is a top view thereof.
Figure 40:
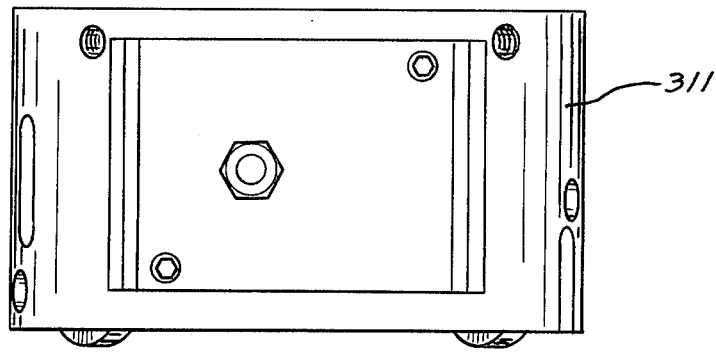
FIG. 40 is a rear (cell side) elevation of the slave boom tube guide assembly.
Figure 42:
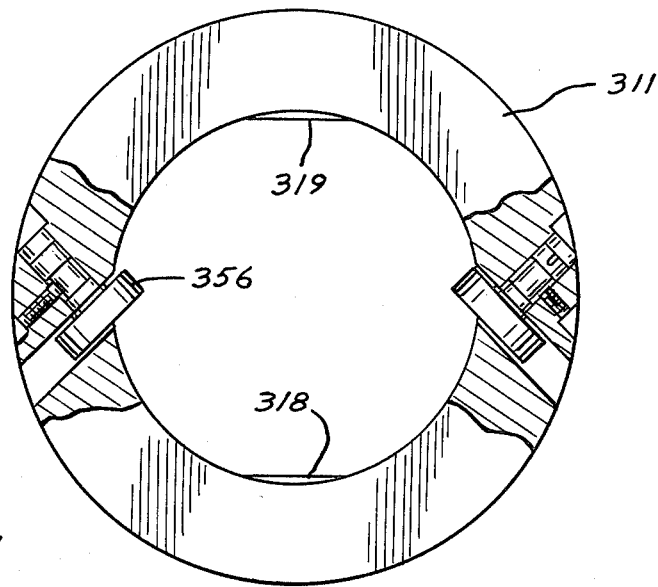
FIG. 42 is a bottom view thereof.
Figure 44:
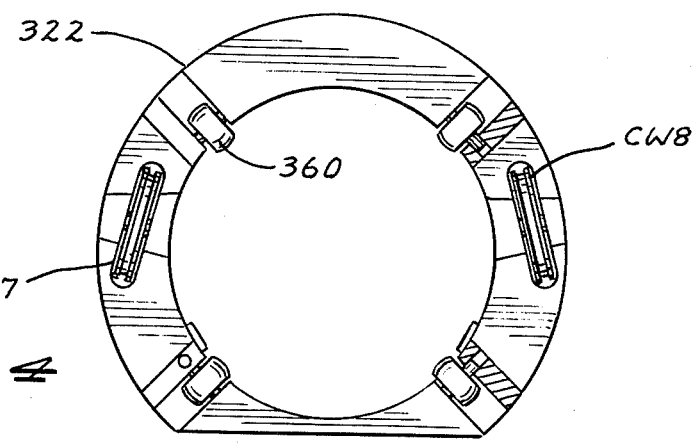
FIG. 44 is a top view thereof.
Figure 43:
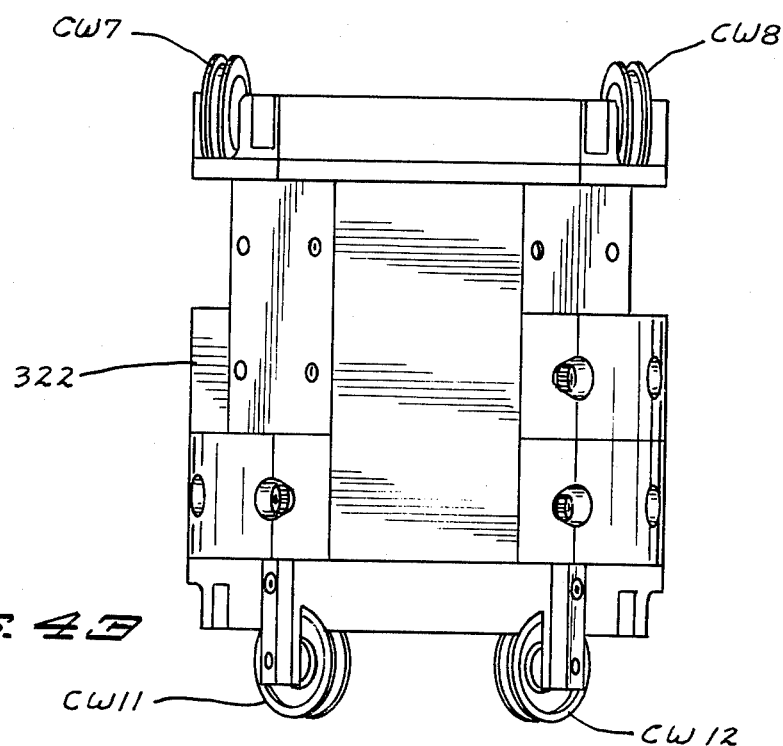
FIG. 43 is a rear (cell side) elevation of the slave Z motion and extension counterweight assembly.
Figure 45:
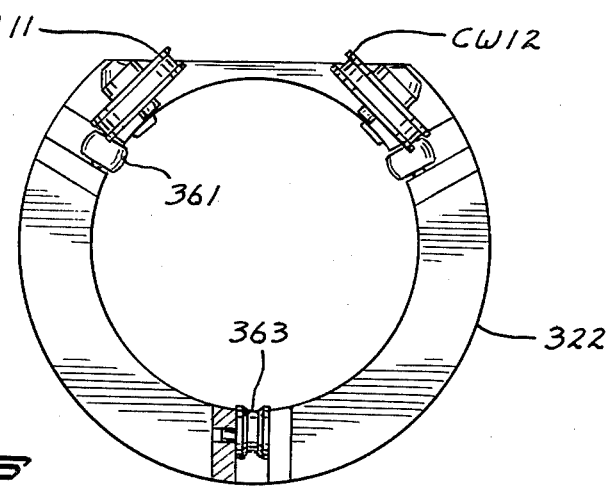
FIG. 45 is a bottom view thereof.

The slave arm in Y motion is counterbalanced by a pair of oppositely movable counterweights 140 and 141 located on the master arm side of the wall. The counterweights are carried by arms 142 and 143, respectively, which in turn are mounted for movement with rings 144 and 145, respectively, in face-to-face abutment and journaled for rotation about master transfer housing 60. As best seen in FIGS. 11 and 12, rings 144 and 145 are adapted to be rotated in opposite directions in response to rotation of Y motion shaft 137 in order to move arms 142 and 143 and their counterweights 140 and 141 in opposite directions. A pinion gear 148 is mounted on Y motion shaft 137 for rotation therewith. Gear 148 meshes with gear 149 rotatable on stub shaft 150, which in turn meshes with gear 151 rotatable on stub shaft 152. Gear 151 in turn meshes with ring gear 146 to rotate counterweight ring 144. Counterweight ring 145 is rotated in the opposite direction by virtue of gear 148 also meshing with gear 153 rotatable on stub shaft 154 and meshing with ring gear 147.

When the slave arm 15 is perpendicular to the horizontal axis of the manipulator through tube 12, the counterweight arms 142 and 143 are aligned with and diametrically opposite arm 15 and the total mass moment of the counterweight system is adjusted to balance the slave arm. As the slave arm is displaced in Y motion, the counterweight arms are displaced in opposite directions in X motion through angles equal to the Y motion displacement angle. Thus, by having a pair of equal weights 140 and 141 of suitable mass on arms 142 and 143, the balance is maintained at all times. Normally, manipulators are used in parallel pairs closely spaced within the reach of the operator and quite often simultaneously indexed in Y motion to reach a work object. As counterweight 140 of a right manipulator is moved in one direction, the same counterweight of the adjacent left manipulator is moved in the same direction. In doing so, the path of left counterweight 140 may overlap the path of right counterweight 141 moving in the opposite direction. However, because of the method of mounting of the counterweights on opposite sides of the displaced counterweight arms, the counterweights are free to move relative to each other without interference.

Lateral rotation, X motion indexing or side canting of the slave arm relative to the master arm is achieved by virtue of an arcuate rack 160 mounted on master transfer housing 62. The teeth of rack 160 mesh with those of pinion 161 driven by electric motor 162 which is mounted on housing 60 of the master transfer assembly. Thus, rotation of pinion 161 causes relative rotation between housings 60 and 62. Because the master arm is rotatable with housing 62 and the slave arm is rotatable with housing 60, the arms are thus rotated laterally with respect to one another. The flexible coupling accomplished by universal joints 78, 88, 92 and 100 accommodates lateral rotation up to about 35° in either direction for the Z, azimuth and elevation and twist motions and, as already described, gear train 109, 110, etc., compensates for lateral rotation in the tong motion.

The motion transfer couplings 82 for Z motion, 94 for right elevation and twist, and 102 for left elevation and twist motions, 90 for azimuth motion, 120 for tong motion, and 138 for Y motion, all protrude from master transfer assembly end plate 164. A pair of locating and orientation pins 165 and 166 also project from end plate 164 to assist in connection of the master transfer assembly to the seal tube assembly.

Seal Tube Assembly (FIGS. 1 and 14-18)

The horizontal seal tube assembly or through tube 12 is adapted to extend through the barrier wall mounted in horizontal tube 174. Tube 174 is sealed in the tube 14 in the wall opening by compression of seal rings 170 by pressure applied to compression ring 171 by screws 172 to cause the rings to expand radially outwardly and tightly engage the surface of the opening in sealing relationship. Tube 174A is journaled within tube 174 so as to be freely rotatable therein.

Tube 174A is sealed in tube 174 by means of an annular rotary shaft seal 173 which may be, for example, of the type shown and described in Jennrich et al U.S. Pat. No. 3,507,163, or equivalent shaft sealing means. Preferably, however, the seals are of the so-called "Ferro-Fluidic" type in which a film of oil containing finely divided magnetic particles is maintained in a magnetic field, as seen schematically in FIG. 16A. A pair of annular spaced apart steel plates are disposed about the shaft with running clearance. A permanent magnet is disposed between the plates. A magnetic field is set up through the plates and adjacent shaft surface to hold the oil in the spaces between the plates and shaft.

The end plate 164 of the master transfer assembly is adapted to fit in face-to-face abutment with a mirror image end plate 175 of the seal tube (FIG. 18). Orientation pins 165 and 166 of the master transfer assembly engaged sockets 176 and 177, respectively, in the seal tube end plate. The two end plates are secured together as by bolts or equivalent fastening means. Master transfer Z motion coupling 82 engages seal plate coupling 178. Correspondingly, master transfer azimuth coupling 90 engages seal tube coupling 179; right and left elevation and twist master transfer couplings 94 and 102 engage seal tube couplings 180 and 181, respectively; tong master transfer coupling 120 engages seal tube coupling 182; and Y motion master transfer coupling 138 engages seal tube coupling 183.

Each of couplings 178-183 is splined to be rotatable with a horizontal shaft 184-189, respectively, each of which extends through the length of the seal tube and terminates in a further coupling 190-195, respectively, in the seal tube end plate 196 at the slave end. Each of couplings 178-183 is spring loaded and provided with ratchet lock means for engaging similar lock means in seal tube face plate 175 so that upon assembly and disassembly of the seal tube and master transfer assembly, each of the seal tube couplings and shafts retains its proper orientation. When the master transfer end plate is connected to the seal tube end plate, the master transfer couplings project sufficiently far that upon engagement with the corresponding seal tube couplings, the couplings 178-183 on shafts 184-189 are forced toward the slave arm sufficiently far to release the locking means and permit rotation of the shafts.

Shafts 184-189 are provided with appropriate seals to prevent transmission of contaminating substances from the slave cell to the operator's area. Preferably these are Ferro-Fluidic seals. Before terminating in couplings 190-195 in end plate 196, each of shafts 184-189 extends through an intermediate end plate 197 at the slave cell end of the seal tube. End plate 196 is movable relative to the intermediate end plate 197, as described in greater detail hereinafter, to facilitate coupling of the slave transfer assembly 16 to the seal tube.

An appropriate fitting 198 into the seal tube 12 is provided for the purpose of maintaining a pressure differential between the interior and exterior of the seals so that, in the event of seal failure, the outflow caused by high pressure within the seal prevents passage of contaminating substances from the slave cell to the operator's side of the barrier wall.

As best seen in FIG. 15, means are provided by which longitudinal extension of the slave arm relative to the master arm, or Z motion indexing, is accomplished. A bevel gear 200 driven by an electric motor 201 through an appropriate gear reduction system in gear box 202 is mounted on the master end of the seal tube on the operator's side of the barrier wall. Bevel gear 200 meshes with a further bevel gear 203 secured to one end of horizontal shaft 204 journaled for rotation within the seal tube and terminating in a coupling 205 for transmission of rotary motion to the slave arm for extension of that arm.

As best seen in FIGS. 16 and 16B, a short transversely extending shaft 210 is journaled for rotation in seal tube end plate 175. A bevel gear 211 is connected to the inner end of shaft 210. A hexagonal or other polygonal head 212 is provided at the other end of shaft 210 to permit it to be rotated at the operator's side of the wall by means of a crank or similar tool. Bevel gear 211 meshes with a further bevel gear 213 connected at one end to rotate a horizontal coupling shaft 214. The opposite end of coupling shaft 214 is journaled in a bearing housing 215 on the inside face of the intermediate seal tube end plate 197 at the slave arm end.

A segment of coupling shaft 214, spaced from the slave arm end, is threaded at 216 and engages a internally threaded sleeve or collar 217 which is secured to a coupling carrier block 218 for reciprocal movement over a short path therewith. The carrier block 218 is supported for movement within the seal tube by means of a plurality of rollers 219 spaced about its circumference and engaging the inside seal tube wall. Each of the shafts 184-189 extends through and is freely rotatable with respect to the carrier block 218. Block 218 functions as a ram for moving seal tube end plate 196, which is movable relative to stationary end plate 197 to assist in coupling of the slave transfer assembly to the seal tube. A plurality of rods 222 are fixed at one end to block 218. The opposite ends of rods 222 extend through stationary end wall 197 in sliding relation and are rigidly secured to relatively movable end plate 196, as by means of screws 223 or equivalent fastening means.

Movable end wall 196 supports a pair of parallel spaced apart arms 225 and 226 which project into the slave cell. Arms 225 and 226 are each provided with a notched seat 227 adapted to engage projecting ears on the slave transfer assembly in order to support that assembly, as hereinafter described in greater detail. A pair of locating or orientation pins 228 and 229 are fixed in intermediate end wall 197 and extend through movable end wall 196 slidably engaged therein. When it is desired to assembly a slave arm to the seal tube, shaft 210 is rotated with a crank or similar tool so as to rotate bevel gears 211 and 213 and shaft 214 to advance block 218, rods 222 and movable end plate 196 a sufficient distance that the face of the end plate 196 is flush with or slightly beyond the ends of couplings 190-195 and 205. Then, when the slave transfer assembly is cradled in arms 225 and 226, the movable end plate 196 is retracted by rotating shaft 210 in the opposite direction exposing couplings 190-195 and 205 for engagement with the corresponding couplings of the slave transfer assembly.

Slave Transfer Assembly (FIGS. 1 and 19-24)

The slave transfer assembly 16 is enclosed within a rigid tubular housing rigidly connected to and rotatable with the seal tube assembly 12. The slave transfer housing is provided with a pair of projecting gears 235 and 236 engageable, respectively, with the notched seats 227 of projecting arms 225 and 226 of the seal tube assembly. When the slave transfer assembly is seated between arms 225 and 226 of the seal tube, then movable end wall 196 of the seal tube is retracted, as heretofore described, to expose the couplings 190-195 and 205. At the same time, as arms 225 and 226 are retracted with the end wall, the entire slave transfer assembly is pulled into contact with the seal tube such that couplings 190-195 and 205 engage corresponding couplings 240-246, respectively, for continued transfer of the various functional rotary motions. Thus, manual Z motion coupling 190 in the seal tube engages coupling 240 in the transfer assembly. Azimuth coupling 191 engages azimuth coupling 241. Right and left elevation and twist couplings 192 and 193 engage couplings 242 and 243, respectively. Tong coupling 194 engages coupling 244. Y motion coupling 195 engages coupling 245. Finally, motorized Z extension coupling 205 engages coupling 246. Locating pins 228 and 229 engage sockets 247 and 248 in the slave transfer assembly to insure proper engagement of the various couplings.

Couplings 240-246 are each connected for rotation of horizontal shafts 250-256, respectively. As in the case of the seal tube couplings, slave transfer couplings 240-246 are splined to be rotatable with shafts 250-256 and longitudinally movable with respect to those shafts. The couplings are spring loaded and provided with ratchet lock means for maintaining the proper orientation of the couplings and shafts. When the slave transfer assembly is coupled to the seal tube assembly, the couplings are forced inwardly against spring pressure and the ratchet locks are released and the transfer shafts are properly oriented with the corresponding seal tube shafts.

Each of shafts 250-256 terminates in a bevel gear 260-266, respectively. Bevel gears 260-264 and 266 mesh, respectively, with further bevel gears 270-274 and 276, each of which is coupled to a tape drum, for re-translation of the several rotary motions to linear motion. Thus, bevel gear 270 is coupled to drum Z18 for transmission of manual Z motion; bevel gear 271 is coupled to drum Az17 for transmission of azimuth motion. Bevel gears 272 and 273 are coupled to drums ET27 and ET28, respectively, for transmission of right and left elevation and twist motions; bevel gear 274 is coupled to drum T7 for transmission of tong motion; and bevel gear 276 is coupled to drum Z38 for transmission of motorized Z extension motion.

Y motion bevel gear 265 meshes with bevel gear 275 coupled to rotate a rocker arm 277 which is journaled on transverse shaft 278 in the slave transfer housing. A pair of tie rods 279 and 280 are pivotally connected at 281 and 282, respectively, to the rocker arm 277 for pivotal movement of the slave arm about pivot axis 283. As described in greater detail hereinafter, the slave arm is supported on a pair of pivot stub shafts 284 and 285 supported, respectively, in arms 286 and 287 extending from the slave transfer housing.

Arms 286 and 287 also support a pair of pulley banks, upper tier PB8 of three pulleys for carrying tapes for transmitting Z motion and elevation and twist motions as identified in the Table and a lower tier of five pulleys for carrying tapes for transmission of elevation and twist, azimuth and Z motions. Additionally, the slave transfer housing supports a number of guide pulleys as shown and identified, the function of which is best understood by reference to the respective schematics of the several motions.

Slave Arm Assembly (FIGS. 1, 25, 25A and 47)

The slave arm assembly 15 is supported in arms 286 and 287 of the slave transfer assembly 16 for pivotal movement about pivot axis 283. Pivot bushings 298 and 299 (slave pivot assembly FIGS. 26-29) engage pivot stub shafts 284 and 285, respectively, of the slave transfer assembly. Tie rod 279 is pivotally connected at 300 and tie rod 280 is pivotally connected at 301 to the slave pivot housing 302. It will be seen that as the rocker arm 277 in the transfer assembly is rotated, the tie rods are moved in opposite directions to rotate the slave arm on the pivot axis 283 in response to corresponding movement of the master arm or by action of the Y indexing mechanism.

The slave arm is comprised of a plurality of telescoping tubular segments, a trunk tube 305, an intermediate tube 306 of lesser diameter, and a boom tube 307 of still lesser diameter. A wrist joint 21 corresponding to the master arm wrist joint 19 is mounted in the bottommost end of the boom tube 307. A slave azimuth assembly 308, as described in greater detail hereinafter, is mounted on the bottommost end of slave trunk tube 305. An intermediate carriage 309 is mounted on the top of intermediate tube 306 and assists in guiding the intermediate tube in its longitudinal movement relative to the trunk tube. Intermediate tube 306 extends through azimuth assembly 308. Intermediate tube 306 is rotated by rotation of the azimuth tape ring 310 forming part of the azimuth assembly in response to corresponding rotation of the master arm boom tube. Slave arm boom tube 307 and wrist joint 21 rotate about the longitudinal axis of the slave arm with intermediate tube 306. A boom tube guide assembly 311 is carried by the lower end of intermediate tube 306. A boom tube carriage assembly 312 supporting a plurality of rollers 313 spaced about its periphery is secured to the end of boom tube 307.

Figure 51:
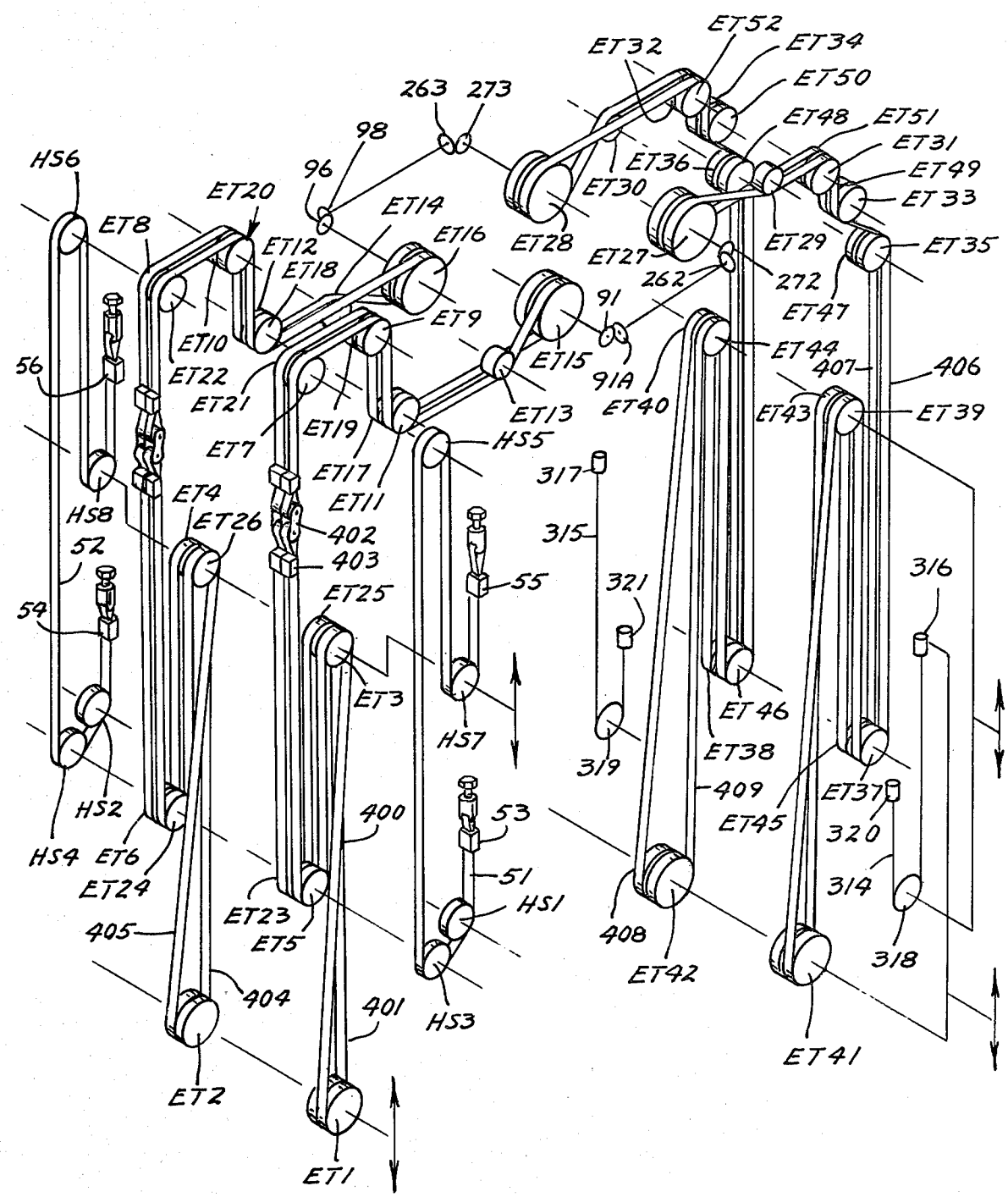
FIG. 51 is a schematic perspective view showing elevation and twist means by which rotation of the handle carried by the master arm about two of its own axes produces corresponding rotation in the slave arm, and by which the master half speed carriage and slave intermediate tube are suspended.

As best seen in conjunction with FIG. 51, intermediate tube 306 is suspended to travel at half the speed of the boom tube 307. The intermediate tube is suspended by cables 314 and 315 anchored, respectively, at 316 and 317 in the slave azimuth assembly and extending around pulleys 318 and 319, respectively, in boom tube guide assembly 311, and thence to anchorages 320 and 321, respectively, in boom tube carriage assembly 312.

Figure 47:
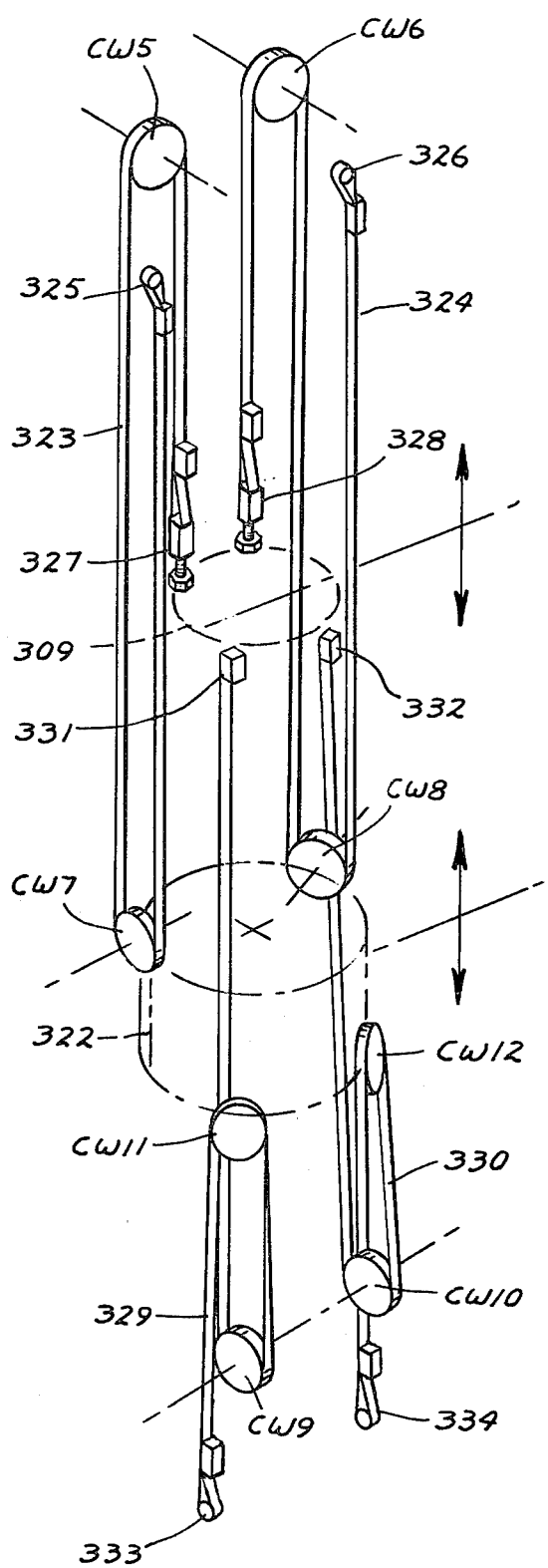
FIG. 47 is a similar schematic view showing the counterbalancing system for the slave boom and intermediate tubes.

As best seen in conjunction with FIG. 47, a Z motion counterweight 322 is suspended around the outside of trunk tube 305 to travel at half the speed of the intermediate tube 306. The counterweight 322 is suspended by a pair of tapes 323 and 324 extending downwardly from anchorages 325 and 326, respectively, in the pivot housing 302, down and around pulleys CW7 and CW8, respectively, on the counterweight, up and over pulleys CW5 and CW6 in the slave pivot housing and terminating in anchorages 327 and 328 in the intermediate carriage 309. To move the counterweight in the opposite direction, tapes 329 and 330 extend, respectively, from anchorages 331 and 332 in intermediate carriage 309 down and around pulleys CW9 and CW10 in the slave azimuth assembly up and over pulleys CW11 and CW12 on the counterweight and down to anchorages 333 and 334 in the azimuth assembly.

Slave Pivot Assembly (FIGS. 25 and 26–30)

The pivot housing 302 supports the trunk tube and connects the slave arm to the slave transfer assembly for rotary movement therewith about the longitudinal axis of the through tube and for relative pivotal movement toward and away from the barrier wall, as described. The pivot housing encloses a plurality of pulley banks. A bank of twelve pulleys PB10 on the wall side of the housing just below the pivot axis 283 carries tapes for azimuth, Z, elevation and twist, and tong motions as identified in the Table. A middle tier bank of ten pulleys PB11 and lower tier bank of ten pulleys PB12 on the opposite side of the pivot housing carry azimuth, Z, elevation and twist and tong motion tapes, as identified in the Table. In addition, the pivot housing carries guide pulleys for Z motion and counterweight tapes and counterweight tape anchorages, as shown.

Slave Azimuth Assembly (FIGS. 25 and 31–36)

The slave azimuth assembly 308 is fixed to the bottommost end of slave trunk tube 305. Two track tape ring 310 is journaled for rotation in the bottom end of the azimuth assembly and rotates the intermediate tube 306 in response to linear movement of the azimuth tapes caused by rotation of the master boom tube. Tape ring 310 is journaled for rotation about ring 337 which in turn is journaled for rotation within ring 338 which is a fixed part of the azimuth assembly. Tape ring 310 is provided with an internal ring gear 340 which meshes with a pinion 342 journaled for rotation within ring 337. Pinion 342 meshes with a further pinion 346 journaled for rotation in ring 337 which meshes with ring gear 344. Tape ring 310 carries one tape anchored therein and wrapped in one direction and a further tape anchored therein and wrapped in the opposite direction. When tape ring 310 is rotated in response to linear travel of those tapes, ring 337, by virtue of pinion 342 meshing both with ring gear 340 in the tape ring and through gear 346 to ring gear 344 fixed to the azimuth housing causes rotation of ring 377 in the same direction and at one half the speed of the tape ring. Since intermediate tube 306 extends through and is adapted to be rotatable with ring 337, the intermediate tube and boom tube 307 are rotated in response to corresponding rotation of the master boom tube. The master azimuth tape ring 36 is similarly mounted.

The azimuth assembly carries guide pulleys for carrying azimuth and Z motion tapes as identified and a bank of eight pulleys PB14 for carrying counterweight, elevation and twist, and tong tapes, as identified in the drawings and Table. The azimuth assembly also contains anchorages 333 and 334 for the slave Z motion counterweight system.

Intermediate Carriage Assembly (FIGS. 25 and 37–39)

Intermediate tube 306 is rotatably supported at its top end in carriage assembly 309. Carriage 309 is adapted for travel within the slave trunk tube 305. The carriage is guided in its travel by rollers 350 which bear against the inside trunk tube wall. The carriage is fixed against rotation by grooved guide roller 352 which engages a longitudinal track 353 (FIG. 25) on the inside wall of the slave trunk tube. The intermediate carriage carries a bank of eight pulleys PB13 which carry the tapes for Z, elevation and twist, and tong motions, as shown and identified in the Table. Other guide pulleys for Z motion tapes are mounted on the carriage as shown, along with anchorages 327 and 328 and 331 and 332 of the Z counterweight suspension system.

Slave Boom Tube Guide Assembly (FIGS. 25A and 40–42)

Boom tube guide assembly 311 is fixed to the bottom end of intermediate tube 306. Boom tube 307 extends through the guide assembly and is longitudinally movable relative thereto. The guide assembly is provided with rollers 356 adapted to engage longitudinal indentations in the wall of the boom tube so that rotary movement of the intermediate tube and guide assembly about the longitudinal axis is transmitted to the boom tube. Guide pulleys 318 and 319 forming part of the suspension system for the intermediate tube (FIG. 51) are mounted in the guide assembly.

Slave Z Motion Counterweight (FIGS. 25 and 43–45)

Counterweight 322 counterbalances the slave arm as intermediate tube 306 and boom tube 307 are extended and retracted in Z motion. Slave trunk tube 305 extends through the counterweight and the counterweight is guided in its travels along the trunk tube by upper rollers 360 and lower rollers 361 which engage the outside wall of the trunk tube. Grooved roller 363 which engages a longitudinal track 364 (FIG. 25) on the outside of the trunk tube 305 restrains the counterweight against rotation relative to the trunk tube. Guide pulleys for counterweight tapes 323, 324, 329 and 330 (FIG. 47) are mounted on the counterweight.

Figure 48:
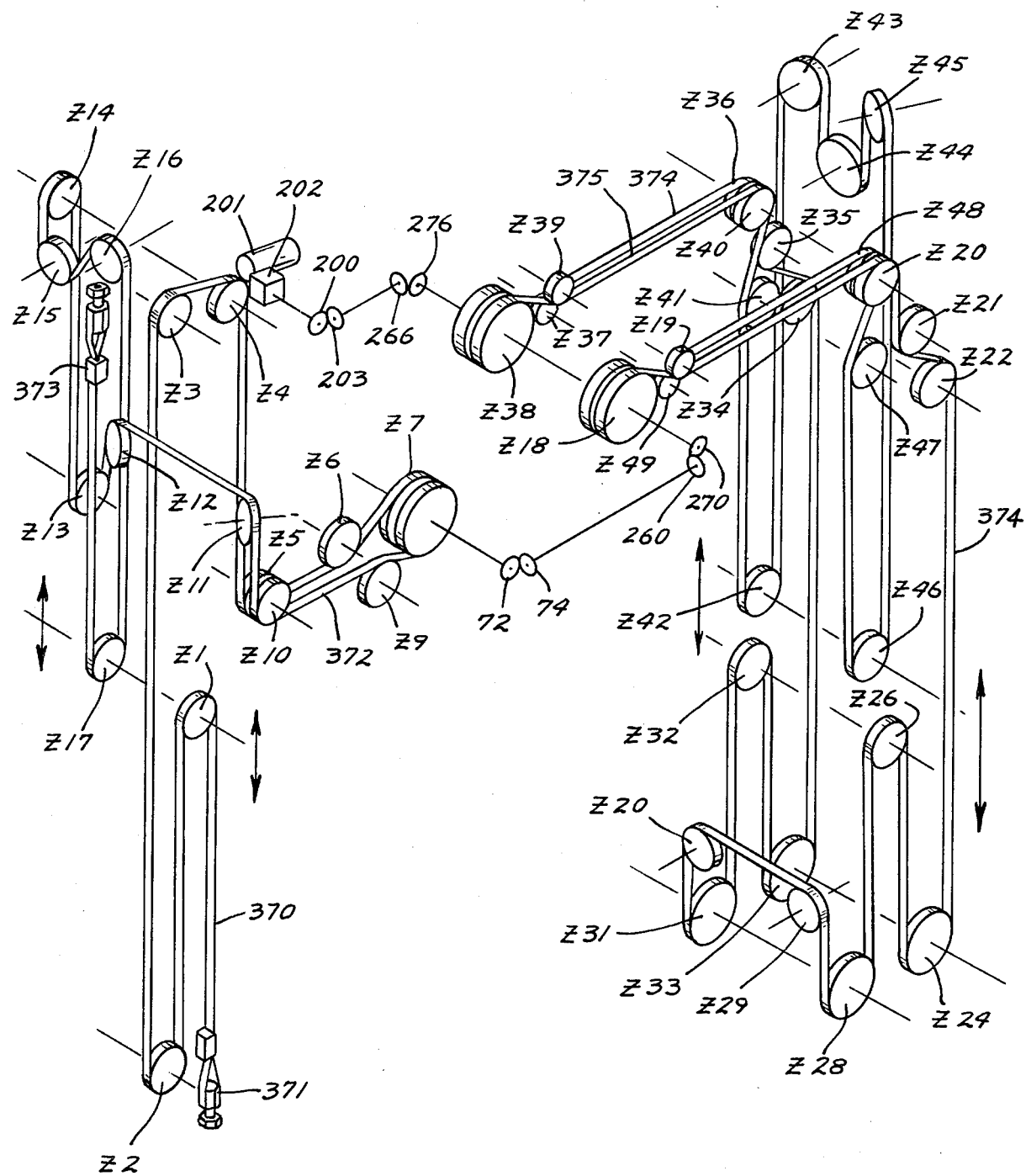
FIG. 48 is a schematic perspective view showing how vertical movement of the master arm produces a corresponding vertical movement (or Z motion) in the slave arm.

Z Motion and Z Extension (FIG. 48)

The manner in which longitudinal extension and retraction of the master boom tube causes corresponding extension and retraction of the slave boom tube, and the manner in which the slave boom tube may be extended relative to the master boom tube, are shown schematically in FIG. 48. For the most part, to avoid obscuring the structure of the various assemblies comprising the manipulator system, the assembly and subassembly drawings are shown without tapes in engagement with the various pulleys and drums. These tape paths in association with the various pulleys and drums are, however, shown schematically.

One end of Z motion tape 370 extends from an anchorage 371 in the master azimuth assembly up and over pulley Z1 in guide carriage 30 at the top of the master boom tube, down and around Z2 in pulley bank PB1 in the master azimuth assembly, up and over pulley Z3 and Z4 in pulley banks PB3 and PB4, respectively, in the bracket at the top of the master arm, down and around pulley Z5 in pulley bank PB5 in the master pivot frame, under guide pulley Z6 in the pulley bank PB6 in the master transfer assembly, and terminating on tape drum Z7 about which it is wound. Tape 372 is wound around drum Z7 in the opposite direction and extends over pulley Z9 in pulley bank PB7 in the master transfer assembly, under and around pulley Z10 in the master pivot frame, up and over pulleys Z11 and Z12 in the pivot frame, down and around pulley Z13 also in pulley bank PB5, up and over pulley Z14 in pulley bank PB4, under and around pulley Z15 and over pulley Z16, both in the master top bracket, down and around pulley Z17 in guide carriage 30 and up to an anchorage 373 in the top bracket.

As the master boom tube is extended or retracted, drum Z7 is caused to rotate, translating the linear travel of tapes 370 and 372 into rotary motion which is transmitted through bevel gears 72 and 74, and the interconnecting shafts and couplings to bevel gears 260 and 270. Bevel gear 270 is coupled to tape drum Z18 to retranslate the rotary motion into linear motion. Tape 374 is wound about drum Z18 in one direction and extends under pulley Z19 in the slave transfer assembly, over pulleys Z20, Z21 and Z22 in pulley banks PB10, PB11 and PB12 in the slave pivot, down and around pulley Z24 in the slave azimuth assembly, up and over pulley Z26 in the slave intermediate carriage, down and around pulley Z28, over pulleys Z29 and Z30 and down and around pulley Z31, all in the slave azimuth assembly, up and over pulley Z32 in the intermediate carriage, down and around pulley Z33 in the azimuth assembly, and up and around pulleys Z34, Z35 and Z36 in pulley banks PB11, PB10 and PB9, respectively, in the slave pivot, over pulley Z37 and terminating wound about drum Z38 in the opposite direction from drum Z18.

Tape 375 is wound about drum Z38 in the opposite direction from tape 374 and extends under pulley Z39 in the slave transfer assembly, around pulley Z40 in pulley bank PB10, down and around pulley Z41 in the pivot housing, down and around pulley Z42 in pulley bank PB13 in the intermediate carriage, up and around pulleys Z43, Z44 and Z45 in the slave pivot housing, down and around pulley Z46 in pulley bank PB13, up and around pulley Z47 in the slave pivot, and pulley Z48 in pulley bank PB10, over pulley Z49 in the slave transfer assembly to drum Z18 where it is wound in the opposite direction from tape 374.

As previously described, electric motor 201 is coupled to rotate bevel gears 200, 203 and the intervening shafts and couplings to rotate bevel gears 266 and 276 which cause rotation of drum Z38. It will be seen that the slave boom tube is extended and retracted both in response to manual extension and retraction of the master boom tube and in response to extension or retraction of the slave boom tube due to operation of electric motor 201.

Where a sealed environment is not essential, the Z indexing system described may be utilized in a conventional manipulator system in which Z motion is transmitted by tapes. In this instance, tapes 370 and 372 are connected directly to tapes 375 and 374, respectively, eliminating drums Z7 and Z18 and interconnecting shaft and gears. Then, motor 201 is connected to drive drum Z38 directly, eliminating the interconnecting shaft and gearing shown in the drawing.

Figure 49:
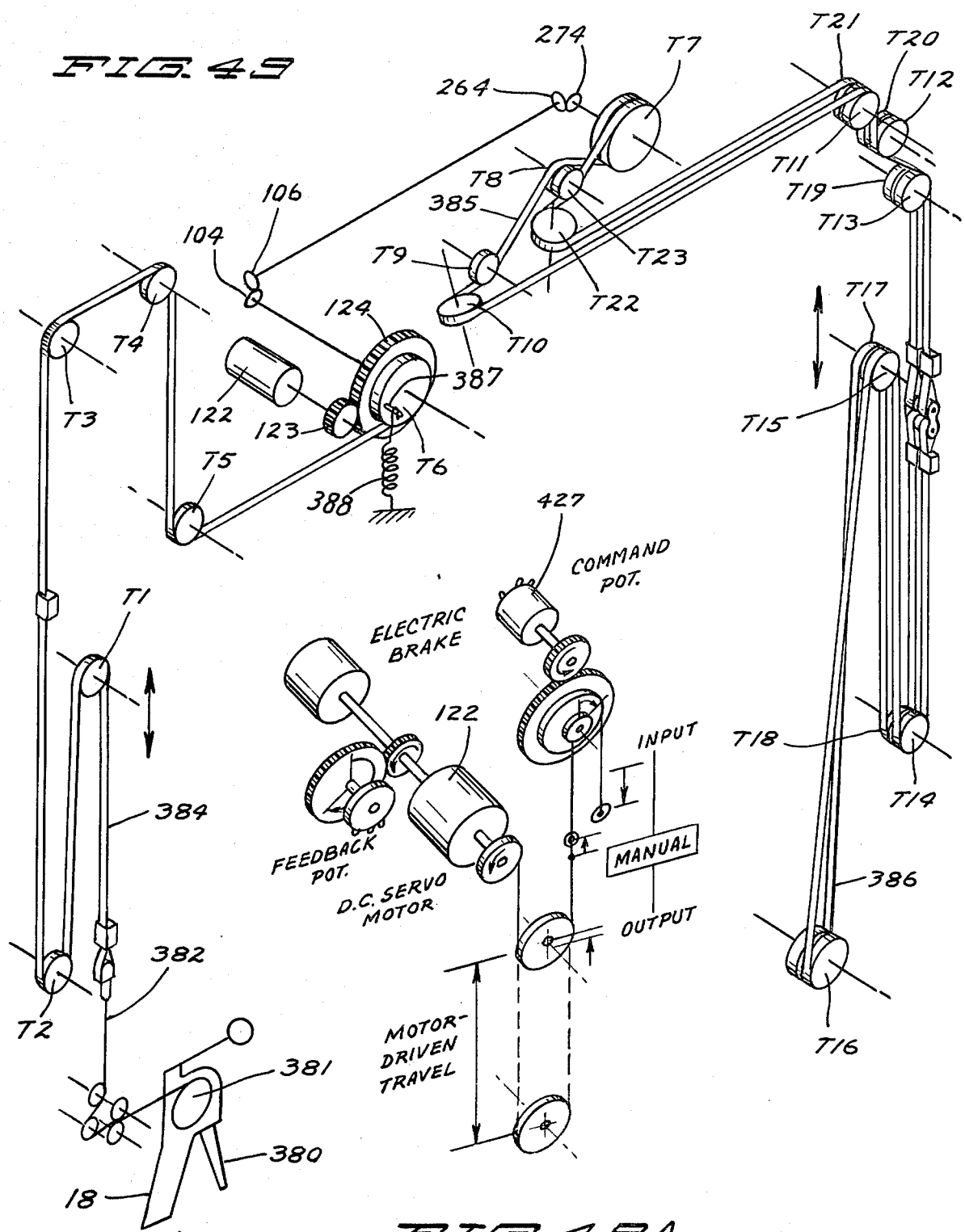
FIG. 49 is a schematic perspective view showing how opening and closing of the handle on the master arms translates into a rotary motion for operation of tongs on the slave arm.

Tong Motion (FIGS. 49 and 49A)

The squeezing motion of the operator on the handle 18 to tong means on the bottommost end of the slave boom tube is shown schematically in FIG. 49. As trigger 380 is squeezed, a disc or drum 381 is rotated. One end of cable 382 is anchored in disc 381 so that rotation of the disc exerts a pulling force on the cable. Cable 382 is guided by pulley means through the wrist joint into the master boom tube where it is connected to tape 384. Tape 384 extends up and over pulley T1 in pulley bank PB2 in the master half-speed carriage 50. The tape extends downward to pulley T2 in pulley bank PB1 in the master azimuth assembly, up and over pulleys T3 and T4 in pulley banks PB3 and PB4 in the bracket at the top of the master arm and downwardly and around pulley T5 in pulley bank PB5 in the master pivot frame and into the master transfer assembly. Tape 384 terminates in drum T6. Pulling force on tape 384 causes the tape to unwind from drum T6 to cause rotation of the manually controlled differential input gear through a total angular range of less than 90°. A spring 388 attached to pin 387 in drum T6 maintains tension in tape 384 and pulls trigger 380 towards the open position.

The grip system of the present invention is designed to overcome common manipulator grip system problems and consequences. Such problems include inefficient power transmission such that the tong squeeze forces are smaller than the operator-exerted forces. High loads in mechanical transmission elements result in wear and fatigue failures. Elongation of tapes or cables requires extra master squeeze travel. Most existing tongs have unidirectional drives. The operator closes the tong but tong opening is by means of return springs. Heavy springs are required to assure opening and sticky joints often cause problems.

According to the improved grip system of the present invention, a DC servo motor power assist provides most of the tong squeeze effort under continuous operator control of tong opening and squeeze force. The use of double tape drums in a rotary drive slave wrist joint, as described in U.S. Pat. No. 3,503,273 of the present inventors, provides bidirectional tong drive. The tapes may be lightly loaded to minimize fatigue. A low-torque, multi-turn, pinion-terminated shaft replaces the conventional tong drive cable. This permits a gear driven tong which is positively driven in opening as well as closing direction. This eliminates reliance on marginally effective springs to open the tong and allows 100 pound grip forces with lightly loaded drive elements.

Referring to FIG. 49A, there is shown a schematic illustration, although not identically related, of the major components of the power assisted tong squeeze system. A manual input tape travel produced by squeezing the trigger 380 of the master handle 18, and limited in extent by the mechanical travel limit of the trigger, drives a command potentiometer 427 by suitable gearing 421, 425, 426 through a substantial portion of its single turn electrical range, and simultaneously drives one end of a continuous tape, which serves as one support for a traveling idler pulley, through a substantially reduced range of travel with a correspondingly increased force. The other end of the tape supporting the traveling idler pulley is driven by a tape drum rotated through suitable gearing by a servo motor system which simultaneously drives a feedback potentiometer, the drive signal for the servo motor being provided by an amplifier responsive to the error signal resulting from the difference in output voltages of the command and feedback potentiometers, and the motor rotation driving the feedback potentiometer in the proper direction and degree of travel to reduce the error signal to a minimum, thus driving the output pulley through a range proportional to but substantially greater than the motion produced by the manually driven tape. The idler pulley thus acts as a tape differential system equivalent to a gear differential which sums or adds the travels of two mechanical inputs while equalizing the input forces or torques. In this manner, the operator feels a reaction force proportional to the output force while commanding a relatively large range of output travel with a restricted manual input travel. An electrically released brake coupled to the servo motor is rapidly activated by a spring in the event of power failure locking the motor drive to maintain a grip on a work piece as long as the operator continues to grip the input trigger, but allowing the limited remaining manual travel to release the work piece when the operator relaxes his grip.

Drum T6 is coupled to one input gear of a differential assembly, the other input gear being coupled to gear 124 which in turn meshes with output gear 123 of the servo motor drive 122. The linear travel of tape 384 is translated into rotary motion and this, added to the rotary power assist introduced through the differential input gear coupled to gear 124, is combined in the output shaft of the differential and transmitted by bevel gears 104 and 106 through the compensating gear train 110, 111, etc., shafts and couplings as described to bevel gears 264 and 274 where the rotary motion is translated back into linear motion. Thus, the motion of the servo motor is transmitted in addition to the manual motion to tape drum T7 where the rotary motion is translated back into linear motion.

Tape 385 is wound in one direction around drum T7 and passes over pulley T8 under pulley T9 and around pulley T10 in the slave transfer assembly pulleys T11, T12 and T13 in pulley banks PB10, PB11 and PB12 in the slave pivot housing down and around pulley T14 in the slave azimuth assembly, up and over pulley T15 in the slave half-speed carriage and down to drum T16 in the slave wrist joint where it is wound in one direction. Rotation of drum T16 operates a rotary tong, such as that of U.S. Pat. No. 3,572,807. Tape 386 is wrapped in the opposite direction around drum T16 and extends upwardly to pulley T17 in the slave half speed carriage, down and around pulley T18 in the slave azimuth assembly, up and around pulleys T19, T20 and T21 in the slave pivot housing, around pulley T22 and under pulley T23 in the slave transfer assembly to drum T7 where it is wrapped in the opposite direction from tape 385.

Figure 50:
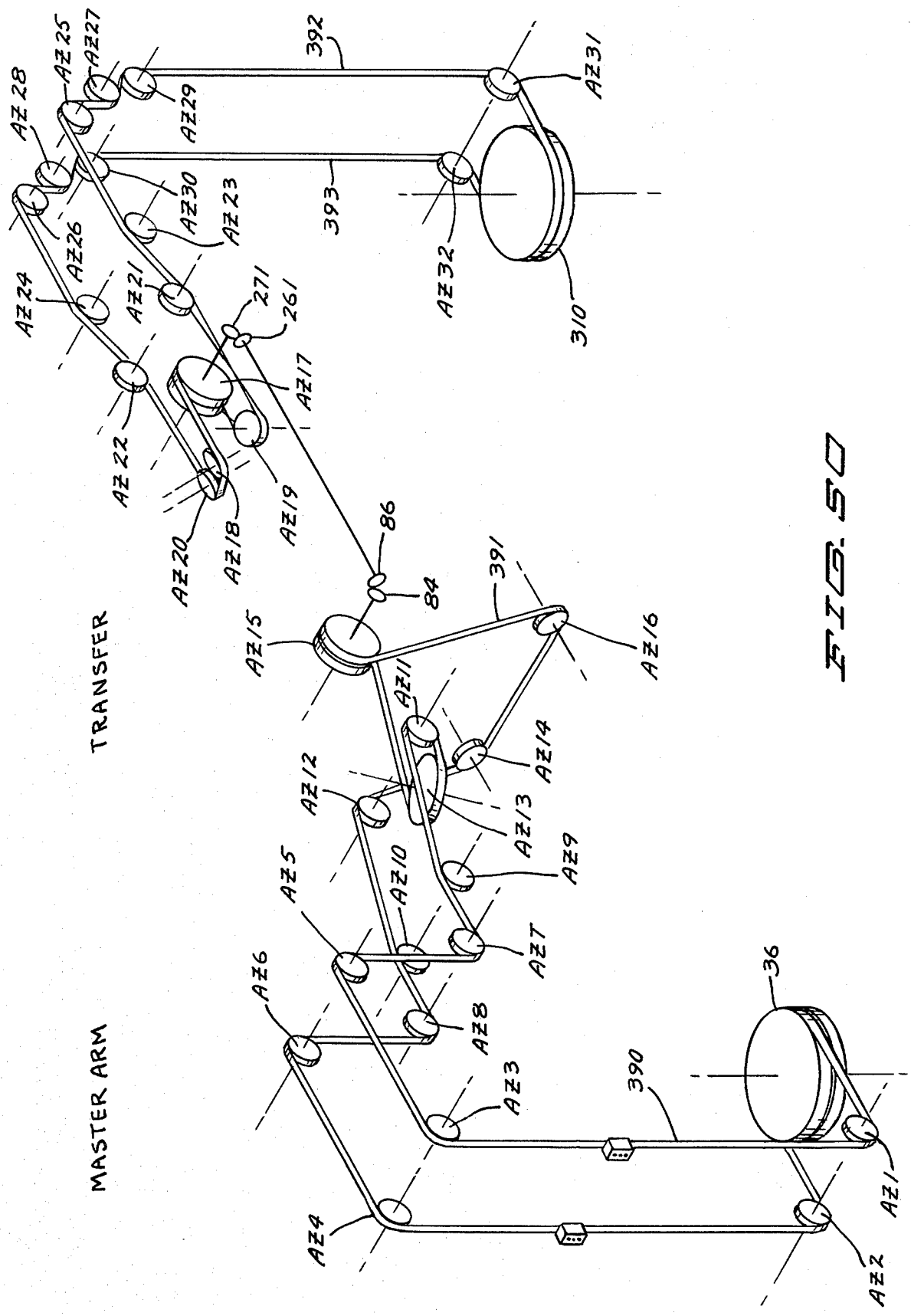
FIG. 50 is a schematic perspective view showing azimuth means by which rotation of the handle about the longitudinal axis of the master arm produces a corresponding rotation about the longitudinal axis of the slave arm.

Azimuth Motion (FIG. 50)

Azimuth tape 390 is wound around ring 36 at the bottom of the master trunk tube in one direction and anchored therein. Tape 390 is guided around pulley Az1 in the master azimuth assembly up and over pulleys Az3 and Az5 in pulley banks PB3 and PB4 in the bracket at the top of the master arm, down and around pulley Az7 in the master pivot housing, over and around pulleys Az9, Az11 and Az13 to drum Az15 where it is wrapped in one direction and anchored. Tape 391 is anchored in drum Az15 and wrapped in the opposite direction. It is guided around pulleys Az16, Az14, Az12 and Az10, all in the master transfer assembly, around pulley Az8 in the master pivot housing, up and over pulleys Az6 and Az4 in the master arm top bracket, down to pulley Az2 in the master azimuth assembly and back to ring 36 where it is wrapped in the opposite direction.

Rotation of ring 36 in response to rotation of the master boom tube results in corresponding rotation of drum Az15, coupled through bevel gears 84 and 86 and shafts and couplings through the seal tube to bevel gears 261 and 271 to drum Az17. Tape 392 is wrapped in one direction around drum Az17 and is guided by pulleys Az19, Az21 and Az23 in the slave transfer assembly, and pulleys Az25, Az27 and Az29 in pulley banks PB10, PB11 and PB12 in the slave pivot to pulley Az31 in the slave azimuth assembly, where it is wrapped around and anchored in ring 310. Tape 393 is wrapped around ring 310 in the opposite direction and is guided by pulley Az32 up and around pulleys Az30, Az28 and Az26 in the slave pivot housing and is guided by pulleys Az24, Az22, Az20 and Az18 in the slave transfer assembly back to drum Az17 where tape 393 is wrapped in the opposite direction from tape 392. It is readily apparent that rotation of ring 36 on the master trunk tube in response to rotation of the master boom tube produces corresponding rotation in ring 310 on the slave trunk tube which is transmitted to the slave intermediate and boom tubes and to the tong carried by the boom tube.

Elevation and Twist Motions (FIG. 51)

FIG. 51 illustrates schematically the means by which rotation of the handle of the master arm about the transverse and longitudinal axes of the wrist joint are transmitted to the tong. Tapes 400 and 401 are anchored and wrapped in opposite directions around drum ET1 in the master wrist joint to transmit right hand elevation and twist motions. Tape 400 is guided over pulley ET3 in the master half speed carriage, down and around pulley ET5 in the master azimuth assembly, up and over pulleys ET7 and ET9 in the top bracket, down and around pulley ET11 in the master pivot housing, under pulley ET13 in the master transfer assembly to drum ET15. Tape 401 is guided from tape drum ET15 around pulley ET17 in the master pivot housing, up and over pulleys ET19 and ET21 in the master arm top bracket, down and around pulley ET23 in the master azimuth assembly, up and over pulley ET25 in the half speed carriage and back to drum ET1 in the master wrist joint. To facilitate installation and proper tensioning, tapes 400 and 401 are desirably in two segments linked together at 402 and secured by clamps 403. The left hand elevation and twist tapes 404 and 405 follow an identical path duplicated in mirror image to tape drum ET16.

Tape drum ET15 translates the linear tape motion to rotary motion and transmits it through bevel gears 91 and 91A, shafts and couplings and bevel gears 262 and 272 to tape drum ET27 in the slave transfer assembly. Similarly, drum ET16 translates the linear motion of the tapes to rotary motion and transmits it through bevel gears 96 and 98 and interconnecting shafts and couplings to bevel gears 263 and 273 to tape drum ET28. Tape 406 is guided by pulley ET29 in the slave transfer assembly, pulleys ET31, ET33 and ET35 in the slave pivot housing, to pulley ET37 in the slave azimuth assembly, up and over pulley ET39 in the intermediate carriage and down to drum ET41 in the slave wrist joint. Tape 407 extends from the tape drum ET41 up and over pulleys ET43 in the intermediate carriage, down and around pulley ET45 in the slave azimuth assembly, up and around pulleys ET47, ET49 and ET51 in the slave pivot and back to drum ET27 in the slave transfer assembly. Right elevation and twist tapes 408 and 409 follow similar paths in mirror image so that the elevation and twist motions of the handle are reproduced in the tong.

Power Assist Handle (FIGS. 52-54)

A preferred form of handle 18 for attachment to the wrist joint 19 of the master boom tube is shown in FIGS. 52 through 54. Handle 18 comprises a frame including a pair of parallel spaced apart plates 410 and 411. A palm engaging pistol grip 412 is secured between the plates and supported from one end of the frame. A tubular shaft 413 secured in the housing 414 in the upper portion of the frame connects the handle to the master wrist joint. A finger engaging trigger 380 is supported in the opposite end of the handle frame secured to shaft 415 journaled for rotation in the frame. A crank arm 416 within the housing is likewise secured to shaft 415 for rotation therewith in response to movement of the trigger. Arm 416 is pivotally connected at 417 to a link 418 which in turn is pivotally connected at 419 to disc 381.

Disc 381 is journaled for rotation in the frame on shaft 420 and has a peripheral groove in which tong cable 382 is seated. The end of cable 382 is anchored in disc 381 so that, as the disc is rotated in response to movement of the trigger by the operator, force is exerted on the cable which is transmitted to operate the tong on the slave arm, as described particularly in connected with FIG. 49. A ratchet wheel 421 engageable by pawl 422 is coupled to disc 381 for rotation therewith. Thus, as the trigger is squeezed by the operator and the disc is rotated, if desired the ratchet 421 may be engaged by pawl 422 to maintain the disc in position. This permits the operator to relax his grip on the trigger while maintaining the grip on the tong to minimize operator fatigue. A pawl release 423 permits the operator to disengage the pawl from the ratchet. The pawl release may likewise be used to render the ratchet braking system inoperative when its use it not desired.

A gear 425 is coupled to rotate with disc 381. Gear 425 meshes with pinion gear 426 coupled to potentiometer 427 mounted on the frame. Because gear 426 is driven in response to movement of the trigger, the position of the trigger is indicated by the resistance of the potentiometer. At the end of the servo motor 122 there is another potentiometer that indicates the position of the tong. Both the handle drive and the tong connect into a differential associated with the servo motor as described above.

It is apparent that many modifications and variations of this invention as hereinbefore set forth may be made without departing from the spirit and scope thereof. The specific embodiments described are given by way of example only and the invention is limited only by the terms of the appended claims.

TABLE I

| Pulley Bank # | Location | Order of tapes as viewed by operator | | | | | | | | | | | |
|---|---|---|---|---|---|---|---|---|---|---|---|---|---|
| 1 | Master azimuth assembly | | HS4 | | | ET6 | ET24 | T2 | ET23 | ET5 | | Z2 | | HS3 | |
| 2 | Master half speed carriage | | | | | ET4 | ET26 | T1 | ET25 | ET3 | | | | | |
| 3 | Master top bracket - operator's side | Az4 | HS6 | | | ET8 | ET22 | T3 | ET21 | ET7 | | Z3 | | HS5 | Az3 |
| 4 | Master top bracket - wall side | Az6 | | Z14 | | ET10 | ET20 | T4 | ET19 | ET9 | | Z4 | | | Az5 |
| 5 | Master pivot frame | Az8 | | Z13 | | ET12 | ET18 | T5 | ET17 | ET11 | | Z5 | Z10 | | Az7 |
| 6 | Master transfer - upper tier | | | | | | | | | ET13 | | Z6 | | | |
| 7 | Master transfer - lower tier | Az10 | | | | ET14 | | | | | | | | Z9 | Az9 |
| 8 | Slave transfer - upper tier | | | Z39 | | | | | | ET29 | | | Z19 | | |
| 9 | Slave transfer - lower tier | Az24 | | Z37 | | ET30 | | | | | | Z49 | | | Az23 |
| 10 | Slave pivot - upper tier | Az26 | | Z36 | Z40 | ET32 | ET52 | T21 | T11 | ET51 | ET31 | Z48 | Z20 | | Az25 |
| 11 | Slave pivot - middle tier | Az28 | | Z35 | | ET34 | ET50 | T20 | T12 | ET49 | ET33 | | Z21 | | Az27 |
| 12 | Slave pivot - lower tier | Az30 | | Z34 | | ET36 | ET48 | T19 | T13 | ET47 | ET35 | | Z22 | | Az29 |
| 13 | Slave intermediate carriage | | | Z42 | | ET40 | ET44 | T17 | T15 | ET43 | ET39 | Z46 | | | |
| 14 | Slave azimuth assembly | | | | CW10 | ET38 | ET46 | T18 | T14 | ET45 | ET37 | CW9 | | | |

The embodiments of the invention in which an exclusive property or privilege is claimed are defined as follows:

1. A remote control master-slave manipulator for performing work on the opposite side of a barrier wall, said manipulator comprising a rotatable fixed horizontal support adapted to extend through said barrier wall, a longitudinally extensible master arm pivotally connected to one end of said horizontal support and rotatable therewith and a longitudinally extensible slave arm pivotally connected to the opposite end of said horizontal support and rotatable therewith, said manipulator characterized by:

(A) a first rotary element journaled for rotation within said horizontal support, (B) linear motion transmission means responsive to manual squeezing motion of an operator extending from the master arm to said first rotary element to translate linear motion to rotary motion, (C) a second rotary element journaled for rotation within said horizontal support and coupled to said first rotary element for rotation therewith, (D) means operative in response to both rotary elements for transmitting tong motion through the horizontal support to the slave arm, and (E) power assist means coupled to said first and second rotary elements for controlling the grip closure and amplifying gripping force of the manipulator.

2. A manipulator according to claim 1 wherein said power assist means comprises:

(A) a motor connected to drive said second rotary element, and (B) a differential system coupling said first and second rotary elements for summing the travels of the manual squeeze input and motor input to said first and second rotary elements.

3. A manipulator according to claim 2 wherein the control system for said motor comprises:

(A) a command potentiometer driven in response to said manual squeezing motion, (B) a feedback potentiometer driven by said motor, and (C) an amplifier for providing a drive signal for said motor, said amplifier responsive to the error signal resulting from the difference in output voltages of said potentiometers.

4. A manipulator according to claim 1 wherein:

(A) said first rotary member is a drum journaled for rotation about a transverse axis, and (B) said second rotary member is a gear coupled to a first longitudinal shaft for transmitting tong motion through said horizontal support to the slave arm.

5. A manipulator according to claim 1 wherein a handle is supported from the end of the master arm, said handle comprising:

(A) a fixed palm engaging portion, (B) a movable finger engaging member, (C) a rotary member journaled for limited rotation responsive to finger movement, (D) a potentiometer, (E) gears interconnecting said rotary member and potentiometer, whereby the resistance of the potentiometer is related to the position of the finger engaging member.

6. A manipulator according to claim 5 wherein:

(A) said rotary member is a disc, (B) a linear motion transmission element is connected to said disc for linear travel in response to rotation of the disc, and (C) said interconnecting gears comprise one gear rotatable with the disc and engaging another gear connected to said potentiometer.

7. A manipulator according to claim 4 wherein:

(A) said horizontal support comprising a rotatable through tube, a master transfer assembly secured to the through tube at one end and a slave transfer assembly secured to the through tube at the opposite end, (B) said master transfer assembly includes a generally cylindrical housing comprised of a first part secured to the through tube and a second part rotatable relative to the first part about a longitudinal axis, (C) said first and second rotary element, longitudinal shaft and interconnecting gear means are in said second housing part, (D) to accommodate relative rotation of said housing parts;

(1) a gear train connects said first longitudinal shaft to a further shaft journaled in both housing parts for rotation about the longitudinal axis of the housing, (2) another gear train connects said further shaft to another longitudinal shaft, parallel to the first longitudinal shaft and journaled for rotation therewith in the first part of said housing.

8. A manipulator according to claim 1 wherein:

(A) said horizontal support comprising a rotatable through tube, a master transfer assembly secured to the through tube at one end and a slave transfer assembly secured to the through tube at the opposite end, (B) said master transfer assembly comprising a generally cylindrical housing abutting the through tube, (C) a further Y motion rotary element is journaled for limited rotational movement within said master transfer housing, (D) link means couple said further rotary element to the master arm for transmission of Y motion, (E) a longitudinal Y motion shaft is journaled for rotation within said housing, (F) a gear on said rotary element engages a gear on said Y motion shaft, and (G) counterweight means on said master transfer assembly comprise:

(1) a pair of rings journaled for rotation about said master transfer housing adjacent the slave end thereof, (2) an annular ring gear within each of said rings, (3) a radial arm extending outwardly from each of said rings and a weight on each of said arms, (4) a first counterweight gear on said Y motion shaft, (5) a second counterweight gear engaging said first counterweight gear and one of said ring gears to rotate one of the weights in one direction, (6) a third and fourth counterweight gear engaging each other, said third counterweight gear engaging said first counterweight gear and said fourth counterweight gear engaging the other of said ring gears to rotate the other of said weights in the opposite direction.

9. A manipulator according to claim 8 wherein:

(A) said further rotary member is a rocker arm journaled for pivotal movement about a transverse axis, and (B) said engaging gears on said second rotary element and second longitudinal shaft are bevel gears.

10. A manipulator according to claim 1 wherein:

(A) said slave arm is double telescoping and provided with linear motion transmission means interconnecting the telescoping segments of the slave arm for moving the slave arm longitudinally, (B) means are provided for transmitting manual longitudinal Z motion of said master arm through the horizontal support as input to said linear motion transmission means for manually moving the slave arm with the master arm, (C) further rotary Z motion means are provided connected to said linear motion transmission means for translation of rotary motion to linear Z motion, and (D) a motor is connected to drive said rotary Z motion means as input to move the slave arm independently of the motion of the master arm.

11. A manipulator according to claim 10 wherein:
(A) said manual Z motion transmission means comprise a first longitudinal Z motion shaft journaled in the through tube for rotation responsive to longitudinal extension of the master arm,
(B) a coupling is disposed in each end of the through tube at each end of said shaft,
(C) a second longitudinal Z motion shaft is journaled in said through tube,
(D) a motor is mounted on said through tube housing adjacent the master arm end thereof,
(E) gear means interconnect said second shaft and motor for rotation of the second shaft, and
(F) a coupling is disposed in the slave arm end of said housing at the end of said second shaft.

12. A manipulator according to claim 11 wherein:
(A) said through tube is a closed cylindrical seal tube housing, and
(B) at least one rotary shaft seal surrounds each of said shafts.

13. A manipulator according to claim 10 wherein:
(A) said linear motion transmission means are a pair of tapes or cables,
(B) said manual Z motion transmission means are a pair of tapes or cables extending from the master arm through the horizontal support to the slave arm,
(C) one end of each of said manual Z motion transmission tapes or cables is integral with one end of each of said linear motion tapes or cables,
(D) said rotary Z motion means is a drum or pulley, and
(E) the opposite ends of said linear motion tapes or cables are wrapped in opposite directions around the rotary means.

14. A romote control master-slave manipulator for performing work on the opposite side of a barrier wall, said manipulator comprising a rotatable horizontal support adapted to extend through said barrier wall, a longitudinally extensible master arm pivotally connected to one end of said horizontal support and rotatable therewith and a longitudinally extensible slave arm pivotally connected to the opposite end of said horizontal support and rotatable therewith, means within said horizontal support for translating linear motion to rotary motion for transfer through the barrier wall and retranslating to linear motion, said manipulator characterized by:
(A) said horizontal support comprising a rotatable through tube, a master transfer assembly secured to the through tube at one end and a slave transfer assembly secured to the through tube at the opposite end,
(B) said master transfer assembly comprising:
 (1) a generally cylindrical housing abutting the through tube at one end,
 (2) pivot means supporting the master arm at the opposite open end,
 (3) a rotary Y motion element journaled for limited rotational movement within said housing,
 (4) link means coupling said rotary element to the master arm for transmission of Y motion,
 (5) a longitudinal Y motion shaft journaled for rotation within said housing, and
 (6) a gear on said rotary element engaging a gear on said Y motion shaft,
(C) counterweight means on said master transfer assembly comprising:
 (1) a pair of rings journaled for rotation about said housing adjacent the closed end thereof,
 (2) an annular ring gear within each of said rings,
 (3) a radial arm extending outwardly from each of said rings and a weight on each of said arms,
 (4) a first pinion gear on said Y motion shaft,
 (5) a second gear engaged with said first gear and with one of said ring gears to rotate one of the weights in one direction,
 (6) a third and fourth gear engaged with each other, said third gear engaged with said first gear and said fourth gear engaged with the other of said ring gears to rotate the other of said weights in the opposite direction.

15. A manipulator according to claim 14 wherein:
(A) said rotary member is a rocker arm journaled for pivotal movement about a transverse axis, and
(B) said engaging gears on said rotary element and longitudinal Y motion shaft are bevel gears.

16. A manipulator according to claim 14 wherein:
(A) means are provided for transmitting manual longitudinal Z motion of said master arm through the horizontal support to the slave arm,
(B) said slave arm is double telescoping and provided with further linear means for extending the slave arm longitudinally independent of the master arm,
(C) further rotary means are provided connected to said further linear means for translation of rotary motion to linear Z motion, and
(D) a motor is connected to drive said further rotary means to independently extend the slave arm.

17. A remote control master-slave manipulator for performing work on the opposite side of a barrier wall, said manipulator comprising a rotatable horizontal support adapted to extend through said barrier wall, a longitudinally extensible master arm pivotally connected to one end of said horizontal support and rotatable therewith and a longitudinally extensible double telescoping slave arm pivotally connected to the opposite end of said horizontal support and rotatable therewith, said manipulator characterized by:
(A) lineare motion transmission means interconnecting the telescoping segments of the slave arm for moving the slave arm longitudinally,
(B) means for transmitting manual longitudinal Z motion of said master arm through the horizontal support as input to said linear motion transmission means for manually moving the slave arm with the master arm,
(C) rotary Z motion indexing means connected to said linear motion transmission means for translation of rotary motion to linear Z motion, and
(D) a motor connected to drive said rotary Z motion means as input to move the slave arm independently of the motion of the master arm.

18. A manipulator according to claim 17 wherein:
(A) said means for transmitting manual Z motion includes means within said horizontal support for translating linear motion to rotary motion for transfer through the barrier wall and retranslating to linear motion,
(B) said horizontal support includes a through tube comprising a cylindrical housing,
(C) a first longitudinal manual Z motion shaft is journaled therein for rotation responsive to longitudinal extension of the master arm,
(D) a coupling is disposed in each end of said housing at each end of said shaft, (E) a second longitudinal Z motion indexing shaft is journaled in said housing,
(F) said motor is mounted on said housing adjacent the master arm end thereof,
(G) gear means interconnect said second shaft and motor for rotation of the second shaft, and
(H) a coupling is disposed in the slave arm end of said housing at the end of said second shaft whereby said motor is connected to drive said rotary Z motion indexing means.

19. A manipulator according to claim 18 wherein:
(A) said through tube is a closed cylindrical seal tube housing, and
(B) at least one rotary shaft seal surrounds each of said shafts.

20. A manipulator according to claim 17 wherein:
(A) said linear motion transmission means are a pair of tapes or cables,
(B) said manual Z motion transmission means are a pair of tapes or cables extending from the master arm through the horizontal support to the slave arm,
(C) one end of each of said manual Z motion transmission tapes or cables is integral with one end of each of said linear motion tapes or cables,
(D) said rotary Z motion means is a drum or pulley, and
(E) the opposite ends of said linear motion tapes or cables are wrapped in opposite directions around the rotary means.

* * * * *

UNITED STATES PATENT AND TRADEMARK OFFICE
CERTIFICATE OF CORRECTION

PATENT NO. : 4,221,516
DATED : September 9, 1980
INVENTOR(S) : Lester W. Haaker et al It is certified that error appears in the above-identified patent and that said Letters Patent are hereby corrected as shown below:

Column 1, line 36, "movements" should be --motions--.

Column 12, line 49, before "end", --top-- is omitted.

Column 13, line 48, "377" should be --337--.

Column 19, lines 51 and 52, "connected" should be --connection--.

Column 24, line 42, "lineare" should be --linear--.

Signed and Sealed this

Twenty-fifth Day of November 1980

[SEAL]

Attest:

SIDNEY A. DIAMOND

Attesting Officer

Commissioner of Patents and Trademarks